US010282095B2

(12) United States Patent
Sato et al.

(10) Patent No.: US 10,282,095 B2
(45) Date of Patent: May 7, 2019

(54) METHOD AND DEVICE FOR MANAGING PERFORMANCE OF STORAGE APPARATUS

(71) Applicant: HITACHI, LTD., Tokyo (JP)

(72) Inventors: Kazuya Sato, Tokyo (JP); Hideo Ohata, Tokyo (JP); Hironobu Sakata, Tokyo (JP); Katsutaka Inoue, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/744,613

(22) PCT Filed: Mar. 9, 2016

(86) PCT No.: PCT/JP2016/057302
§ 371 (c)(1),
(2) Date: Jan. 12, 2018

(87) PCT Pub. No.: WO2017/154127
PCT Pub. Date: Sep. 14, 2017

(65) Prior Publication Data
US 2018/0210656 A1 Jul. 26, 2018

(51) Int. Cl.
*G06F 12/00* (2006.01)
*G06F 3/06* (2006.01)

(52) U.S. Cl.
CPC .............. *G06F 3/0605* (2013.01); *G06F 3/06* (2013.01); *G06F 3/067* (2013.01); *G06F 3/0611* (2013.01);
(Continued)

(58) Field of Classification Search
CPC ........ G06F 3/0605; G06F 3/06; G06F 3/0611; G06F 3/0644
See application file for complete search history.

(56) References Cited

U.S. PATENT DOCUMENTS

| 2007/0271413 A1 | 11/2007 | Fujibayashi et al. |
| 2015/0160858 A1 | 6/2015 | Okada et al. |
| 2016/0350021 A1 | 12/2016 | Matsushita et al. |

FOREIGN PATENT DOCUMENTS

| JP | 2007-115232 A | 5/2007 |
| WO | 2015/029102 A1 | 3/2015 |
| WO | 2015/145532 A1 | 10/2015 |

OTHER PUBLICATIONS

International Search Report dated Apr. 12, 2016 for the International Application No. PCT/JP2016/057302.

*Primary Examiner* — Gurtej Bansal
(74) *Attorney, Agent, or Firm* — Volpe and Koenig, P.C.

(57) ABSTRACT

Proposed are a method and a device for managing the performance of a storage apparatus which uses a combination of different types of drive devices which mutually have different limits as its storage medium so that measures can be systematically taken against problems that may arise in the future as a result of the drive devices reaching their limit. Based on a premise of being able to tier two or more types of storage mediums which have mutually different rewriting limits and response performances and migrate data between the respective tiers according to the response performance, a performance management device estimates a decrement of a storage capacity pursuant to each of the two or more types of storage mediums reaching a rewriting limit, estimates a performance influence on the virtual volume and a timing of occurrence, and displays information related to the estimated performance influence and the timing of occurrence.

12 Claims, 30 Drawing Sheets

(52) U.S. Cl.
CPC .......... *G06F 3/0644* (2013.01); *G06F 3/0647* (2013.01); *G06F 3/0685* (2013.01); *G06F 3/0665* (2013.01)

FIG.5

Analysis Result

410 —

| Timing | Performance Degradation Volume | Target Shortfall Volume |
|---|---|---|
| 2016/03 | VOL 1 | - |
| 2017/10 | VOL 1 | VOL 1 |
| 2019/07 | VOL 2 | - |
| 2020/01 | VOL 3 | - |
| 2021/03 | VOL 3 | VOL 3 |

Expansion Capacity

420 —

| Storage Apparatus | Pool | Tier ID | Expansion Capacity | Expansion Time Limit |
|---|---|---|---|---|
| Storage A | Pool A | Tier 1 | 1.4 [TB] | 2017/09 |
| Storage A | Pool A | Tier 2 | 0.8 [TB] | 2017/09 |

Volume Migration Plan

430 —

| Storage Apparatus | Pool | Volume | Migration Destination Storage Apparatus | Migration Destination Pool |
|---|---|---|---|---|
| Storage A | Pool A | VOL 2 | Storage A | Pool B |

[Re-Execute Analysis] 440  [End Analysis] 450

<Analysis Condition Table>

| Item | Value |
|---|---|
| Storage Apparatus ID | Storage A |
| Pool ID | Pool A |
| Analysis Mode | I |

<Volume Target Retention Performance Table>

| Volume ID | Target Retention Performance |
|---|---|
| VOL 1 | 0.5 [ms] |
| VOL 2 | null |
| VOL 3 | 0.5 [ms] |
| ... | ... |

<Target Retention Time Limit Table>

| Target Retention Time Limit |
|---|
| 2018/03/31 |

<Expansion Capacity Table>

| Tier ID | Capacity |
|---|---|
| Tier 1 | 3.5 [TB] |
| Tier 2 | 0 [GB] |

<Storage Apparatus Table>

| Storage Apparatus ID |
|---|
| Storage A |
| ... |

<Pool Table>

| Pool ID | Storage Apparatus ID |
|---|---|
| Pool A | Storage A |
| Pool B | Storage A |
| ... | ... |

<Pool Configuration Tier Table>

| Tier ID | Pool ID | Storage Apparatus ID | Response Time | Allocated Capacity |
|---|---|---|---|---|
| Tier 1 | Pool A | Storage A | 0.1 [ms] | 4.5 [TB] |
| Tier 2 | Pool A | Storage A | 1.0 [ms] | 3.0 [TB] |
| Tier 1 | Pool B | Storage A | 0.1 [ms] | 2.0 [TB] |
| Tier 2 | Pool B | Storage A | 1.0 [ms] | 3.0 [TB] |
| ... | ... | ... | ... | |

<Volume Table>

| Volume ID | Storage Apparatus ID | Pool ID | Connection Destination Host ID |
|---|---|---|---|
| VOL 1 | Storage A | Pool A | Host A |
| VOL 2 | Storage A | Pool A | Host B |
| VOL 3 | Storage A | Pool A | Host A |
| ... | ... | ... | ... |

<Volume Capacity Information Table>

| Year/Month | Volume ID | Storage Apparatus ID | Pool ID | Allocated Capacity | Used Capacity |
|---|---|---|---|---|---|
| ... | ... | ... | ... | ... | ... |
| 2015/09 | VOL 1 | Storage A | Pool A | 60 [GB] | 21 [GB] |
| 2015/09 | VOL 2 | Storage A | Pool A | 80 [GB] | 7 [GB] |
| 2015/09 | VOL 3 | Storage A | Pool A | 50 [GB] | 13 [GB] |
| 2015/09 | ... | ... | ... | ... | ... |
| 2015/10 | VOL 1 | Storage A | Pool A | 60 [GB] | 23 [GB] |
| 2015/10 | VOL 2 | Storage A | Pool A | 80 [GB] | 10 [GB] |
| 2015/10 | VOL 3 | Storage A | Pool A | 50 [GB] | 19 [GB] |
| 2015/10 | ... | ... | ... | ... | ... |

<Flash Drive Table> 235

| Drive ID | Storage Apparatus ID | Allocated Pool ID | Capacity | Allocated Tier ID | Flash Limit Count |
|---|---|---|---|---|---|
| Flash Drive A11 | Storage A | Pool A | 1.5 [TB] | Tier 1 | 100,000 |
| Flash Drive A12 | Storage A | Pool A | 1.5 [TB] | Tier 1 | 100,000 |
| ... | Storage A | Pool A | ... | ... | ... |
| Flash Drive A21 | Storage A | Pool A | 1.5 [TB] | Tier 2 | 30,000 |
| Flash Drive A22 | Storage A | Pool A | 1.5 [TB] | Tier 2 | 30,000 |
| ... | ... | ... | ... | ... | ... |
| 235A | 235B | 235C | 235D | 235E | 235F |

FIG.16

<Drive Flash Count Table>                    236

| Drive ID | Storage Apparatus ID | Time | Flash Count |
|---|---|---|---|
| Flash Drive A11 | Storage A | 2013/04/03 00:00:00 | 13 |
| Flash Drive A11 | Storage A | ... | ... |
| Flash Drive A11 | Storage A | 2015/09/01 00:00:00 | 13091 |
| Flash Drive A12 | Storage A | 2013/04/03 00:00:00 | 12 |
| Flash Drive A12 | Storage A | ... | ... |
| Flash Drive A12 | Storage A | 2015/09/01 00:00:00 | 4101 |
| Flash Drive A13 | Storage A | 2015/07/01 00:00:00 | 9 |
| Flash Drive A13 | Storage A | ... | ... |
| Flash Drive A13 | Storage A | 2015/09/01 00:00:00 | 21 |
| Flash Drive A14 | Storage A | 2015/07/01 00:00:00 | 11 |
| Flash Drive A14 | Storage A | ... | ... |
| Flash Drive A14 | Storage A | 2015/09/01 00:00:00 | 23 |
| ... | ... | ... | ... |

<Page Table>                    237

| Page ID | Tier ID | Pool ID | Storage Apparatus ID | Volume ID | Page Size |
|---|---|---|---|---|---|
| Page 1 | Tier 1 | Pool A | Storage A | VOL 1 | 40 [MB] |
| ... | Tier 1 | Pool A | Storage A | ... | 40 [MB] |
| Page 1000 | Tier 1 | Pool A | Storage A | VOL 2 | 40 [MB] |
| Page 1001 | Tier 2 | Pool A | Storage A | VOL 1 | 40 [MB] |
| ... | Tier 2 | Pool A | Storage A | ... | 40 [MB] |
| Page 2000 | Tier 2 | Pool A | Storage A | VOL 3 | 40 [MB] |
| Page 2001 | Tier 3 | Pool A | Storage A | VOL 2 | 40 [MB] |
| ... | Tier 3 | Pool A | Storage A | ... | 40 [MB] |
| Page 3000 | Tier 3 | Pool A | Storage A | VOL 3 | 40 [MB] |
| ... | ... | ... | ... | ... | ... |

<Page Load Table>

| Year/Month | Page ID | Pool ID | Storage Apparatus ID | IOPS |
|---|---|---|---|---|
| ... | ... | ... | ... | ... |
| 2015/09 | Page 1 | Pool A | Storage A | 149 |
| 2015/09 | ... | Pool A | Storage A | ... |
| 2015/09 | Page 1000 | Pool A | Storage A | 139 |
| 2015/09 | Page 1001 | Pool A | Storage A | 103 |
| 2015/09 | ... | Pool A | Storage A | ... |
| 2015/09 | Page 2000 | Pool A | Storage A | 80 |
| 2015/09 | Page 2001 | Pool A | Storage A | 78 |
| 2015/09 | ... | Pool A | Storage A | ... |
| 2015/09 | Page 3000 | Pool A | Storage A | 39 |
| 2015/09 | ... | ... | Storage A | ... |
| 2015/10 | Page 1 | Pool A | Storage A | 131 |
| 2015/10 | ... | Pool A | Storage A | ... |
| 2015/10 | Page 1000 | Pool A | Storage A | 107 |
| 2015/10 | Page 1001 | Pool A | Storage A | 106 |
| 2015/10 | ... | Pool A | Storage A | ... |
| 2015/10 | Page 2000 | Pool A | Storage A | 89 |
| 2015/10 | Page 2001 | Pool A | Storage A | 88 |
| 2015/10 | ... | Pool A | Storage A | ... |
| 2015/10 | Page 3000 | Pool A | Storage A | 42 |
| 2015/10 | ... | ... | ... | ... |

<Flash Count Upper Limit Reach Timing Table> — 201

| Drive ID | Flash Count Upper Limit Reach Timing |
|---|---|
| Flash Drive A11 | 2016/03 |
| Flash Drive A12 | 2017/10 |
| Flash Drive A21 | 2019/07 |
| Flash Drive A13 | 2020/01 |
| Flash Drive A22 | 2021/03 |
| ... | ... |

<Tier Capacity Estimation Table> — 202

| Year/Month | Capacity Of Tier 1 | Capacity Of Tier 2 |
|---|---|---|
| 2015/10 | 4.5 [TB] | 3.0 [TB] |
| 2016/03 | 3.0 [TB] | 3.0 [TB] |
| 2017/10 | 1.5 [TB] | 3.0 [TB] |
| 2019/07 | 1.5 [TB] | 1.5 [TB] |
| 2020/01 | 0 [TB] | 1.5 [TB] |
| 2021/03 | 0 [TB] | 0 [TB] |

<Page Load Estimation Table> — 204

| Year/Month | Page ID | IOPS |
|---|---|---|
| 2016/03 | Page 1 | 140 |
| 2016/03 | ... | ... |
| 2016/03 | Page 1000 | 123 |
| 2016/03 | Page 1001 | 105 |
| 2016/03 | ... | ... |
| 2016/03 | Page 2000 | 85 |
| 2016/03 | Page 2001 | 83 |
| 2016/03 | ... | ... |
| 2016/03 | Page 3000 | 41 |
| 2016/03 | ... | ... |
| ... | ... | ... |

<Page Arrangement Destination Tier Table>

203

| Year/Month | Page ID | Tier ID |
|---|---|---|
| 2015/10 | Page 1 | Tier 1 |
| 2015/10 | ... | Tier 1 |
| 2015/10 | Page 1000 | Tier 1 |
| 2015/10 | Page 1001 | Tier 2 |
| 2015/10 | ... | Tier 2 |
| 2015/10 | Page 2000 | Tier 2 |
| 2015/10 | Page 2001 | Tier 3 |
| 2015/10 | ... | Tier 3 |
| 2016/03 | Page 1 | Tier 2 |
| 2016/03 | ... | Tier 2 |
| 2016/03 | Page 1000 | Tier 2 |
| 2016/03 | Page 1001 | Tier 3 |
| 2016/03 | ... | Tier 3 |
| 2016/03 | Page 2000 | Tier 3 |
| 2016/03 | ... | Tier 3 |
| 2017/10 | Page 1 | Tier 3 |
| 2017/10 | ... | Tier 3 |
| 2017/10 | Page 2000 | Tier 3 |
| ... | ... | ... |

<Response Performance Degradation Volume Table>

205

| Year/Month | Volume ID |
|---|---|
| 2016/03 | VOL 1 |
| 2017/10 | VOL 1 |
| 2019/07 | VOL 2 |
| 2020/01 | VOL 3 |
| 2021/03 | VOL 3 |

<Volume Response Performance Table>

| Year/Month | Volume ID | Response Performance |
|---|---|---|
| 2016/03 | VOL 1 | 0.37 [ms] |
| 2017/10 | VOL 1 | 1.0 [ms] |
| 2019/07 | VOL 2 | 1.0 [ms] |
| 2020/01 | VOL 3 | 0.37 [ms] |
| 2021/03 | VOL 3 | 0.75 [ms] |

<Target Shortfall Volume Table>

| Year/Month | Volume ID |
|---|---|
| 2017/10 | VOL 1 |
| 2021/03 | VOL 3 |

<Analysis Result Table>

| Year/Month | Performance Degradation Volume | Target Shortfall Volume |
|---|---|---|
| 2016/03 | VOL 1 | – |
| 2017/10 | VOL 1 | VOL 1 |
| 2019/07 | VOL 2 | – |
| 2020/01 | VOL 3 | – |
| 2021/03 | VOL 3 | VOL 3 |

<Required Expansion Capacity Table>

| Tier ID | Required Expansion Capacity | Expansion Time Limit |
|---|---|---|
| Tier 1 | 1.4 [TB] | 2017/09 |
| Tier 2 | 0.8 [GB] | 2017/09 |

<Volume Migration Plan Table>

| Volume ID | Migration Destination Storage Apparatus ID | Migration Destination Pool ID |
|---|---|---|
| VOL 2 | Storage A | Pool B |

209A 209B 209C ~209

METHOD AND DEVICE FOR MANAGING PERFORMANCE OF STORAGE APPARATUS

TECHNICAL FIELD

The present invention relates to a method and a device for managing the performance of a storage apparatus equipped with two or more types of storage mediums which have mutually different rewriting limits and response performances, and in particular can be suitably applied to a method and a device for managing the performance of a storage apparatus in which a combination of flash drives with different memory cell structures or a combination of a flash drive and a hard disk drive is tiered, and data can be migrated between the respective tiers according to the response performance.

BACKGROUND ART

Conventionally, in a storage apparatus that uses a combination of a flash memory drive and a hard disk drive as its storage medium, information related to the usage status is acquired for each storage medium and, when information related to the usage status of one type of storage medium is exceeding a first threshold and information related to the usage status of another type of storage medium is not exceeding a second threshold, data of the former storage medium is migrated to the latter storage medium (for example, refer to PTL 1). It is thereby possible to achieve both the realization of low power consumption and the maintenance of high performance.

CITATION LIST

Patent Literature

[PTL 1] Japanese Patent Application Publication No. 2007-115232

SUMMARY OF THE INVENTION

Problems to be Solved by the Invention

However, with this kind of conventional technology, consideration is given only to ex-post facto measures based only on the premise of the flash memory drives and the hard disk drives configuring the current storage apparatus, and no consideration is given to systematically taking measures, such as increasing the number of drives in advance, against problems that may arise in the future as a result of the flash drive devices reaching their limit.

The present invention was devised in view of the foregoing points, and an object of this invention is to propose a method and a device for managing the performance of a storage apparatus which uses a combination of different types of drive devices which mutually have different limits as its storage medium so that measures can be systematically taken against problems that may arise in the future as a result of the drive devices reaching their limit.

Means to Solve the Problems

In order to achieve the foregoing object, the present invention provides a performance management device of a storage apparatus comprising two or more types of storage mediums which have mutually different rewriting limits and response performances. The storage apparatus provides, to a host computer connected to the storage apparatus, a virtual volume configuring a virtual logical volume by using the two or more types of storage mediums, when a write request is issued from the host computer to write data into an unwritten address of the virtual volume, the storage apparatus writes data according to the write request in a storage area of a storage medium among the two or more types of storage mediums which is unused and which has not yet reached a writing limit, and, according an IO load of the host computer in each storage area of each of the two or more types of storage mediums, the storage apparatus migrates a storage location of data from a storage area of a storage medium with a lower response performance to a storage area of a storage medium with a higher response performance and which has not yet reached a writing limit, or from a storage area of a storage medium with a higher response performance to a storage area of a storage medium with a lower response performance and which has not yet reached a writing limit. The performance management device includes a performance influence estimation unit which estimates a decrement of a storage capacity pursuant to each of the two or more types of storage mediums reaching a rewriting limit, and estimates a performance influence on the virtual volume and a timing of occurrence thereof, and a performance influence display unit which displays information related to the estimated performance influence and the timing of occurrence thereof.

Furthermore, the present invention additionally provides a performance management method based on a performance management device for managing a storage apparatus comprising two or more types of storage mediums which have mutually different rewriting limits and response performances. The storage apparatus provides, to a host computer connected to the storage apparatus, a virtual volume configuring a virtual logical volume by using the two or more types of storage mediums, when a write request is issued from the host computer to write data into an unwritten address of the virtual volume, the storage apparatus writes data according to the write request in a storage area of a storage medium among the two or more types of storage mediums which is unused and which has not yet reached a writing limit, and, according an IO load of the host computer in each storage area of each of the two or more types of storage mediums, the storage apparatus migrates a storage location of data from a storage area of a storage medium with a lower response performance to a storage area of a storage medium with a higher response performance and which has not yet reached a writing limit, or from a storage area of a storage medium with a higher response performance to a storage area of a storage medium with a lower response performance and which has not yet reached a writing limit. The performance management method includes a performance influence estimation step of estimating a decrement of a storage capacity pursuant to each of the two or more types of storage mediums reaching a rewriting limit, and estimating a performance influence on the virtual volume and a timing of occurrence thereof, and a performance influence display step of displaying information related to the estimated performance influence and the timing of occurrence thereof.

Advantageous Effects of the Invention

According to the present invention, it is possible to realize a method and a device for managing the performance of a storage apparatus which uses a combination of different types of drive devices which mutually have different limits as its storage medium so that measures can be systematically taken against problems that may arise in the future as a result of the drive devices reaching their limit.

BRIEF DESCRIPTION OF DRAWINGS

FIG. 5 is a diagram showing an example of the screen showing the analysis result.

FIG. 6 is a diagram showing an example of the analysis condition table.

FIG. 7 is a diagram showing an example of the volume target response performance table.

FIG. 8 is a diagram showing an example of the target retention time limit table.

FIG. 9 is a diagram showing an example of the expansion capacity table.

FIG. 10 is a diagram showing an example of the storage apparatus table.

FIG. 11 is a diagram showing an example of the pool table.

FIG. 12 is a diagram showing an example of the pool configuration tier table.

FIG. 13 is a diagram showing an example of the volume table.

FIG. 14 is a diagram showing an example of the volume capacity information table.

FIG. 15 is a diagram showing an example of the flash drive table.

FIG. 16 is a diagram showing an example of the drive flash count table.

FIG. 17 is a diagram showing an example of the page table.

FIG. 18 is a diagram showing an example of the page load table.

FIG. 19 is a diagram showing an example of the flash count upper limit reach timing table.

FIG. 20 is a diagram showing an example of the tier capacity estimation table.

FIG. 21 is a diagram showing an example of the page load estimation table.

FIG. 22 is a diagram showing an example of the page arrangement destination tier table.

FIG. 23 is a diagram showing an example of the response performance degradation volume table.

FIG. 24 is a diagram showing an example of the volume response performance table.

FIG. 25 is a diagram showing an example of the target shortfall volume table.

FIG. 26 is a diagram showing an example of the analysis result table.

FIG. 27 is a diagram showing an example of the required expansion capacity table.

FIG. 28 is a diagram showing an example of the volume migration plan table.

DESCRIPTION OF EMBODIMENTS

An embodiment of the present invention is now explained in detail with reference to the appended drawings.

Note that, while information of the present invention is explained using expressions such as "aaa table", "aaa list", "aaa DB", and "aaa queue" in the ensuing explanation, the foregoing information may also be expressed in forms other than the data structures of table, list, DB, and queue. Thus, in order to indicate that the foregoing information is not dependent on the data structure, the expression of "aaa information" may be used in substitute for expressions such as "aaa table", "aaa list", "aaa DB", and "aaa queue".

Furthermore, while expressions such as "identifying information", "identifier", "name", "label", and "ID" are used upon explaining the contents of the respective types of information, these expressions are interchangeable.

While the ensuing explanation may be provided using the term "program" as the subject, because a program is executed by a processor and predetermined processing is thereby performed by using a memory, a disk device and a communication device, the ensuing explanation may also be provided using the term "processor" as the subject. Furthermore, the processing disclosed with the term "program" as the subject may also be described as the processing to be performed by a computer such as a management server, or an information processing device. Moreover, a part of the program or the entire program may also be realized with dedicated hardware.

Furthermore, the various types of programs may also be installed in the respective computers by a program distribution server, or a computer-readable storage media. In the foregoing case, the program distribution server includes a CPU and a storage resource, and the storage resource additionally stores a distribution program and programs to be distributed. Moreover, by the CPU executing the distribution program, the CPU of the program distribution server distributes the programs to be distributed to other computers.

(1) Configuration of Computer System According to this Embodiment

Figure 1:
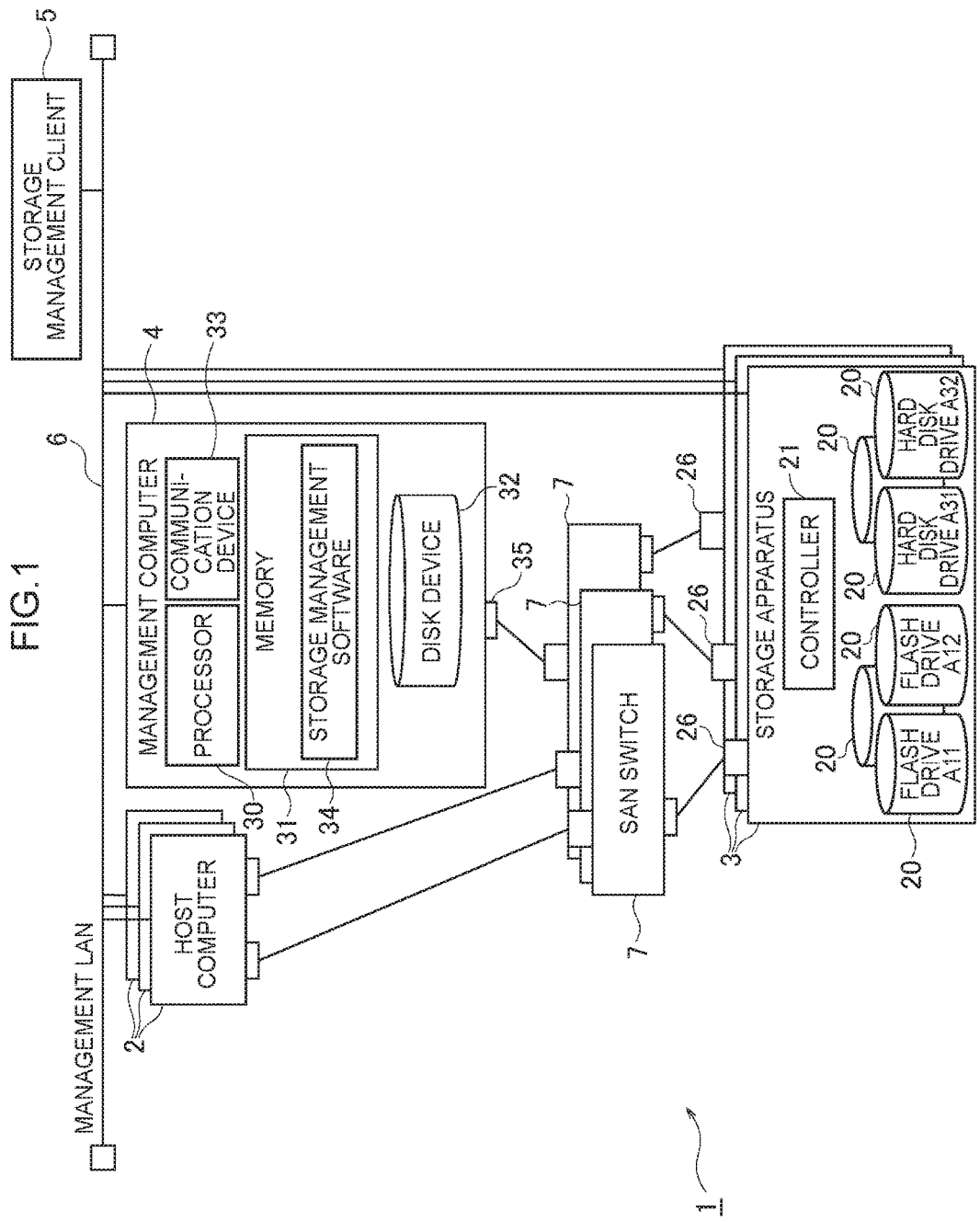
FIG. 1 is a block diagram showing an example of the overall configuration of the computer system according to this embodiment.

FIG. 1 is a diagram showing a configuration example of the computer system 1 according to this embodiment. In the computer system 1, one or more host computers 2, one or more storage apparatuses 3, a management computer 4 and a storage management client 5 are mutually connected via a management LAN (Local Area Network) 6, and the host computer 2, the storage apparatus 3 and the management computer 4 are mutually connected via one or more SAN (Storage Area Network) switches 7.

The host computer 2 is a computer device which executes various types of processing according to the user's business and, while not shown, comprises a processor, a memory, a disk device and a communication device. The processor is hardware which controls the operation of the overall host computer 2. Moreover, the memory is primarily used for storing various types of programs, and is also used as a work memory of the processor. Business software as the application software for executing the user's business and an OS (Operating System) are also stored and retained in the memory. The disk device is a large-capacity storage device which is used for storing various types of programs and various types of data for a long period and is configured, for example, from a hard disk device or the like. Furthermore, the communication device performs protocol control during communication with the storage apparatus 3 and the management computer 4 which is performed via the management LAN 6 and the SAN switch 7.

The storage apparatus 3 is a large-capacity storage device which provides a virtual logical volume (this is hereinafter referred to as a "virtual volume" or simply as a "volume") to the host computer 2. The storage apparatus 3 comprises one or more storage devices 20, and a controller 21 which controls the I/O of data to and from the storage device 20.

The storage device 20 is configured from two or more types of storage mediums which have mutually different rewriting limits and response performances. Specifically, the storage device 20 may be configured, for example, from flash drives (SSD (Solid State Drives)) using flash memories having different memory cell structures, or a combination of a flash drive and a hard disk drive.

The controller 21 includes one or more processors, a memory, and one or more cache memories. The processor is hardware which controls the operation of the overall storage apparatus 3. The memory is primarily used for storing various types of programs, and is also used as a work memory of the processor. Furthermore, the memory additionally stores a virtual environment control program which performs control according to a read request or a write request issued from the host computer 2 to the virtual volume. The cache memory is used for temporarily storing data to be input/output to and from the storage device 20.

The management computer 4 is a computer device which manages the overall computer system 1, and includes a processor 30, a memory 31, a disk device 32 and a communication device 33.

The processor 30 is hardware with a function of controlling the operation of the overall management computer 4. The memory 31 is primarily used for storing various types of programs, and is also used as a work memory of the processor 30. The memory 31 stores storage management software 34. The storage management software 34 has a function of collecting configuration information and performance information of the SAN environment, and analyzing the performance issues based on the collected information.

The disk device 32 is a large-capacity storage device which is used for storing various types of programs and various types of data for a long period and is configured by including, for example, a hard disk device. The communication device 33 performs protocol control during communication with the host computer 2 and the storage apparatus 3 which is performed via the management LAN 6 and the SAN switch 7.

The management computer 4 includes an I/O device. As an example of the I/O device, considered may be at least one among a display, a keyboard and a pointer device, but other devices may also be used. A serial interface (or Ethernet interface) may also be adopted in substitute for the I/O device. The input and display using the I/O device may be substituted by connecting a display computer including at least one among a display or a keyboard and a pointer device to the interface and sending display information to the display computer and receiving input information from the display computer to display information on the display computer or receive inputs with the display computer.

In the ensuing explanation, an aggregate of one or more computers which manage the computer system 1 and display the display information may be referred to as a "management system". When the management computer 4 is to display the display information, the management computer 4 is the management system, and a combination of the management computer 4 and display computer is also the management system. Furthermore, the same processing as the management computer 4 may be realized using a plurality of computers for performing the management processing faster or more reliably, and in such a case the plurality of computers (including the display computer when the display computer is to display information) correspond to the management system.

The storage management client 5 is a communication terminal device which provides the user interface of the storage management software 34 stored in the memory 31 of the management computer 4 as described above. The storage management client 5 at least includes an input device and an output device (both not shown). The input device is hardware to be used by the user for making various types of input, and is at least one among, for instance, a keyboard, a mouse and a touch panel. Meanwhile, the output device is a display device for displaying various types of GUI (Graphical User Interface) or the like, and is configured, for instance, from a liquid crystal panel. The storage management client 5 communicates with the storage management software 34 of the management computer 4 via the management LAN 6.

(2) Tiered Storage System Using Tiers

Figure 2:
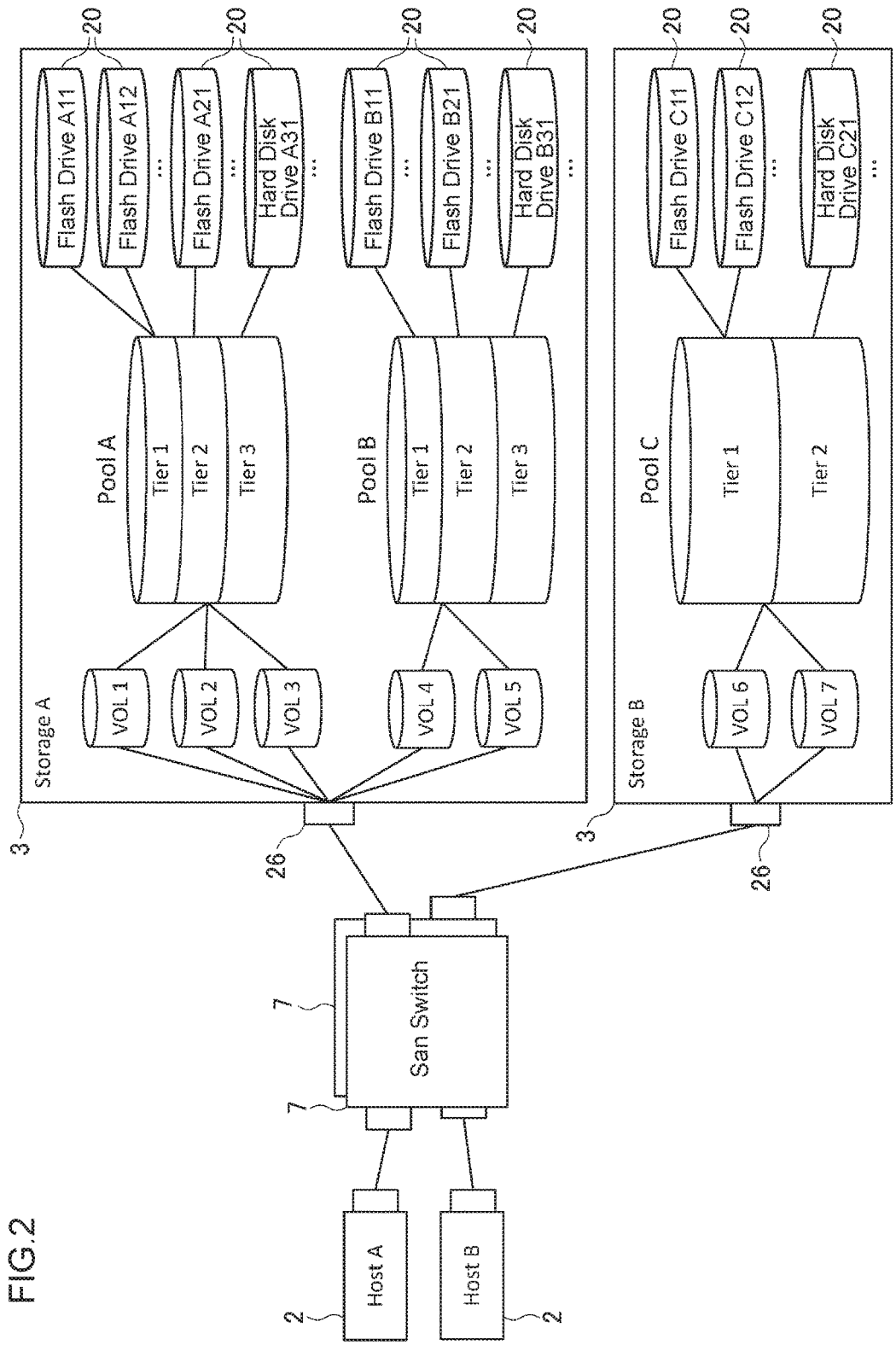
FIG. 2 is a diagram showing an example of the resource configuration and the relevance of resources of the computer system.

FIG. 2 is a conceptual diagram showing an example of the tiered storage system using tiers. The tiered storage system is a management means for migrating data between a high performance (thus a relatively high cost) storage media and a low performance (thus a relative low cost) storage media according to predetermined policies. Here, pools (these are hereinafter also referred to as "tiered pools") created by using storage devices 20 configured from different types of flash drives or a combination of a flash drive and a hard disk drive are used. In a tiered pool, the storage device 20 of which performance (tier) to be assigned is determined based on the access load of page units to the virtual volumes belonging to the tiered pool. Specifically, for example, a high performance drive is assigned to a page with a high access load, and a low performance drive is assigned to a page with a low access load.

The two host computers 2 named "Host A" and "Host B" are respectively configured so that they can access the volumes of volume ID "VOL 1" to "VOL 7" in the storage apparatus 3 via the SAN switch 7.

The volumes of volume ID "VOL 1" to "VOL 3" are assigned to the pool of pool ID "Pool A", the volumes of volume ID "VOL 4" and "VOL 5" are assigned to the pool of pool ID "Pool B", and the volumes of volume ID "VOL 6" and "VOL 7" are assigned to the pool of pool ID "Pool C".

In each of the pools, the two pools having the pool ID of "Pool A" and "Pool B" are respectively tiered, for example, in the three tiers of Tier 1 to Tier 3, and the pool having the pool ID of "Pool C" is tiered, for example, in the two tiers of Tier 1 and Tier 2. Here, in order to differentiate each of the tiers (i.e., Tier 1 to Tier 3), they will be differentiated by using the term "tier ID".

In the pool of pool ID "Pool A", a storage device 20 configured from a flash drive A11, a flash drive A12 and so on (not shown; hereinafter the same) is assigned to the tier of tier ID "Tier 1", a storage device 20 configured from a flash drive A21 and so on is assigned to the tier of tier ID "Tier 2", and a storage device 20 configured from a hard disk drive A31 and so on is assigned to the tier of tier ID "Tier 3".

In the pool of pool ID "Pool B", a storage device 20 configured from a flash drive B11 and so on is assigned to the tier of tier ID "Tier 1", a storage device 20 configured from a flash drive B21 and so on is assigned to the tier of tier ID "Tier 2", and a storage device 20 configured from a hard disk drive B31 is assigned to the tier of tier ID "Tier 3".

In the pool of pool ID "Pool C", a storage device 20 configured from a flash drive C11, a flash drive C12 and so on is assigned to the tier of tier ID "Tier 1", and a storage device 20 configured from a hard disk drive C21 and so on is assigned to the tier of tier ID "Tier 2".

The foregoing correspondence relationship is managed in the respective tables shown in FIG. 10 to FIG. 17 described later, and the details of the processing performed using these tables will be described later.

(3) Management Computer

Figure 3:
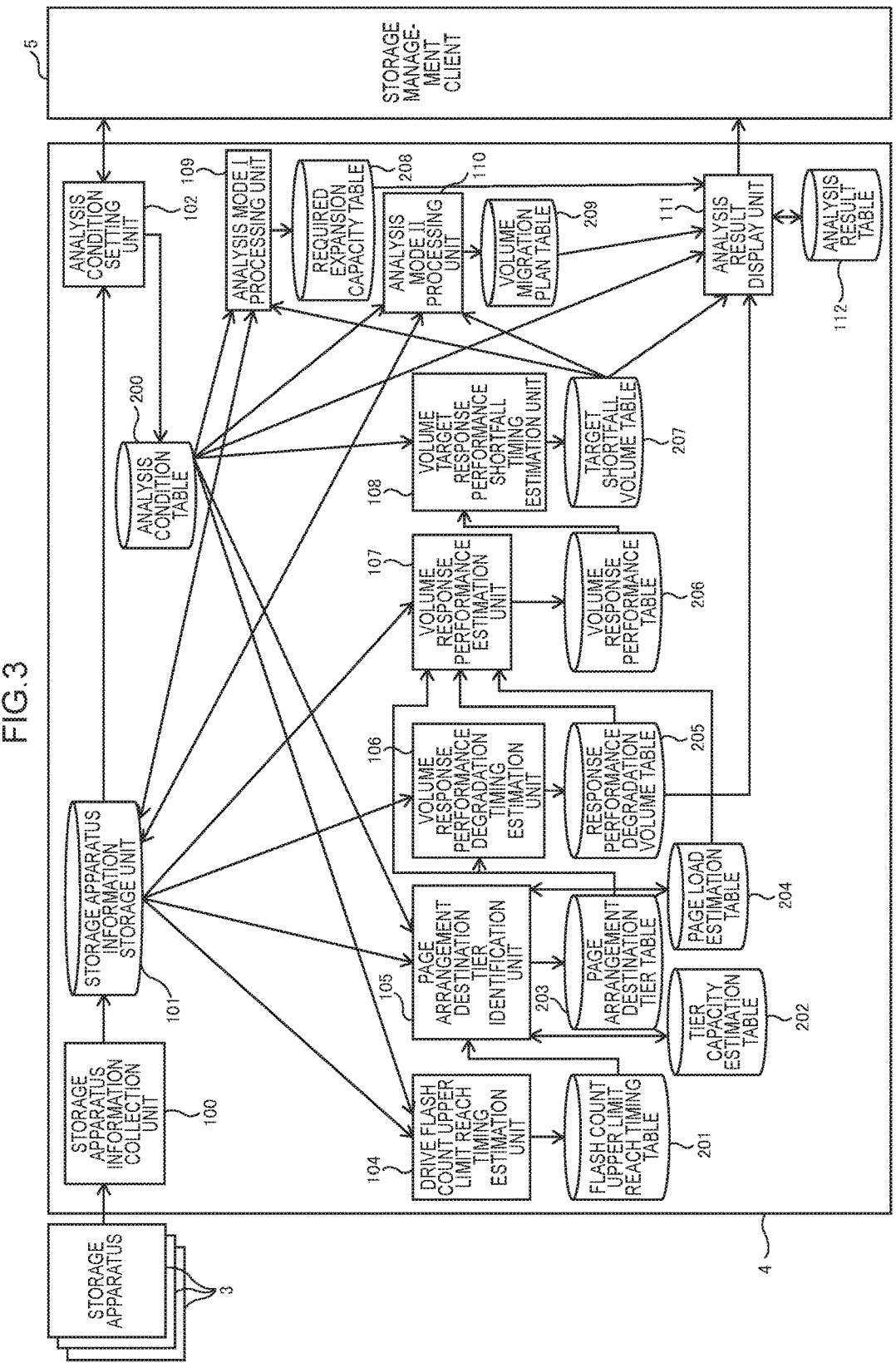
FIG. 3 is a block diagram primarily showing an example of the logical configuration related to the storage performance analyzing function of the management computer.

FIG. 3 is a block diagram primarily showing a configuration example of the management computer 4 according to this embodiment. In the illustrated example, the arrows represent the flow of information, the information stored in the table located at the back end of an arrow is used by the processing unit located at the front end of that arrow, and the processing unit located at the back end of an arrow stores the table located at the front end of the that arrow.

The management computer 4 includes, in addition to a storage apparatus information collection unit 100 and a storage apparatus information storage unit 101, for instance, an analysis condition setting unit 102, a drive flash count upper limit reach timing estimation unit 104, a page arrangement destination tier identification unit 105, a volume response performance degradation timing estimation unit 106, a volume response performance estimation unit 107, a volume target response performance shortfall timing estimation unit 108, an analysis mode I processing unit 109, an analysis mode II processing unit 110, an analysis result display unit 111 and an analysis result table 112.

The storage apparatus information collection unit 100 constantly collects the storage information described later from the storage apparatus 3, and stores the collected storage information in the storage apparatus information storage unit 101. The drive flash count upper limit reach timing estimation unit 104 and other units use the storage apparatus information of the storage apparatus information storage unit 101 and perform the analysis processing as described in detail later. The analysis result display unit 111 displays the analysis result based on the analysis result table 112 which includes such analysis result.

Otherwise, the management computer 4 includes, as a part of the table group, an analysis condition table 200, a flash count upper limit reach timing table 201, a tier capacity estimation table 202, a page arrangement destination tier table 203, a page load estimation table 204, a response performance degradation volume table 205, a volume response performance table 206, a target shortfall volume table 207, a required expansion capacity table 208 and a volume migration plan table 209. Note that these tables are a part of the table group as described above, and the explanation of the remainder of the table group will be collectively provided later.

In this embodiment, based on the combination of the respective tables described above, the management computer 4 is configured to display, for example, the timing that the response performance degradation of the volume will begin or the timing that the target response performance of the volume can no longer be achieved due to the decrease in the total capacity of the storage device 20 configured from a flash drive and the like (this is hereinafter also referred to as the "shortfall timing"), and information related to the capacity of drives that need to be added or the migration destination pool as measures for extending the period that the target response performance of the volume can be achieved (this is hereinafter also referred to as the "target achievement period"). This is now explained in further detail with reference to screen examples.

(4) Screen Examples

Figure 4:
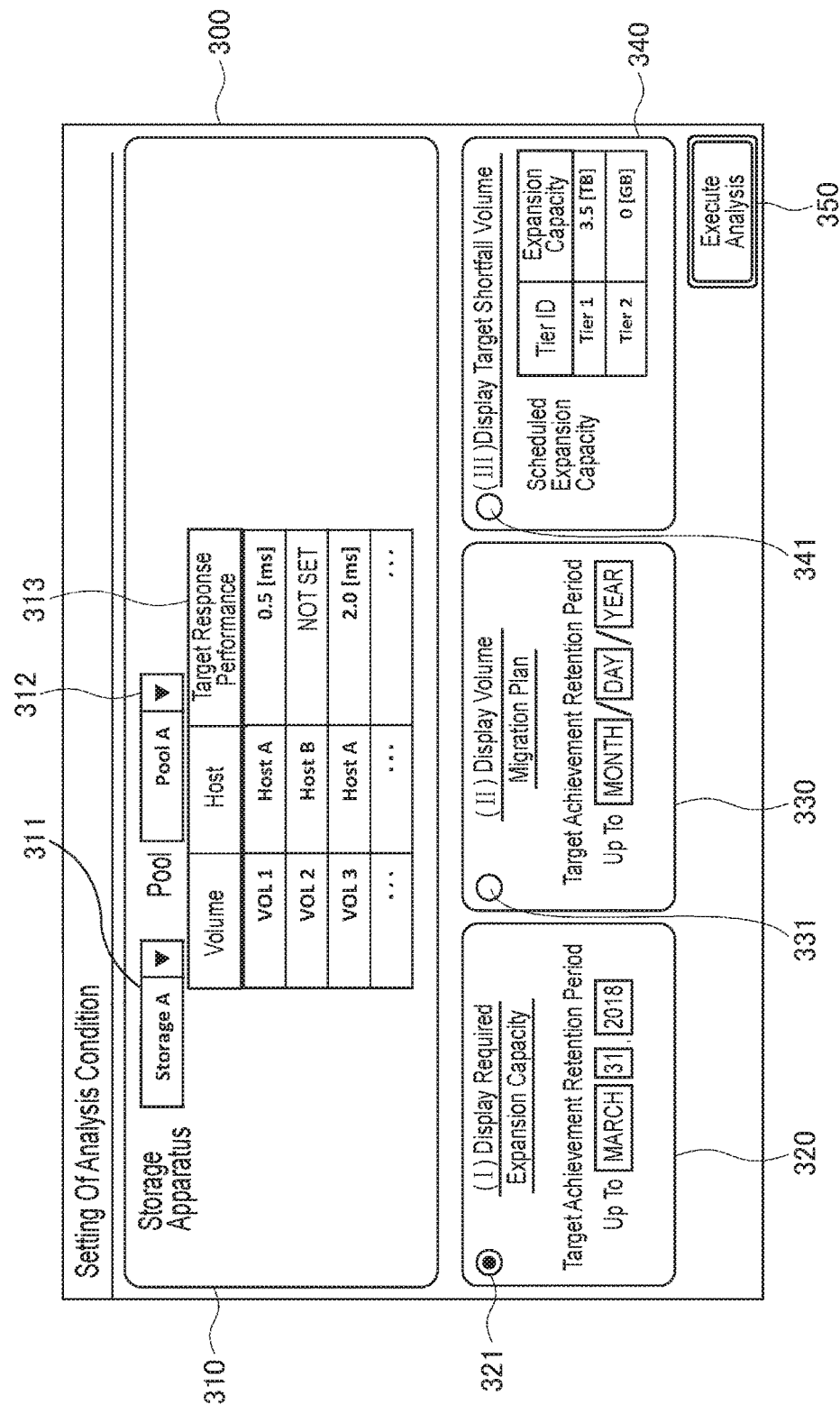
FIG. 4 is a diagram showing an example of the setting screen of the analysis condition.

FIG. 4 is a diagram showing an example of the data input screen for setting the analysis condition. FIG. 5 is a diagram showing an example of the result output screen showing the result of the analysis based on the input analysis condition. The analysis condition setting screen 300 shown in FIG. 4 is displayed by the analysis condition setting unit 102 (refer to FIG. 3), and, for instance, includes a common input column 310, an analysis mode I input column 320, an analysis mode II input column 330, an analysis mode III input column 340 and an analysis execution button 350.

The analysis condition setting unit 102 displays the analysis condition setting screen 300 based on information which was previously stored in the storage apparatus information storage unit 101 as explained above, and registers, in the analysis condition table 200, the analysis condition that was input on the analysis condition setting screen. Here, in this embodiment, several analysis modes are available as the analysis method related to the future performance degradation of the volume. Details of the respective analysis modes will be described later.

In the foregoing analysis condition setting screen, the common input column 310 is an item column for setting the common input items in the respective analysis modes. The common input column 310 includes a storage apparatus input column 311, a pool input column 312 and a target response performance input column 313.

The storage apparatus input column 311 is an input column of a pull-down menu format (not shown), and, by selecting the storage apparatus ID of the intended storage apparatus 3 among the plurality of storage apparatus IDs listed in the pull-down menu, the storage apparatus 3 is selected, and the storage apparatus ID corresponding to the selected storage apparatus 3 is input. The storage apparatus IDs listed in the pull-down menu are the storage apparatus IDs of all storage apparatuses 3 to be managed by the management computer 4. In the illustrated example, as the storage apparatus ID, "Storage A" has been selected as an example.

The pool input column 312 is an input column of a pull-down menu format (not shown), and, by selecting the pool ID of the intended pool among the plurality of pool IDs listed in the pull-down menu, the pool ID corresponding to the selected pool is input. The pool IDs listed in the pull-down menu are the pool IDs of all pools created in the storage apparatus 3 of the storage apparatus ID selected in the storage apparatus input column 311. In the illustrated example, as the pool ID, "Pool A" has been selected as an example.

The target response performance input column 313 is a column to which the targeted response performance (this is hereinafter also referred to as the "target response performance") is input. Because the target response performance input column 313 displays a list of the volume IDs of all volumes to which is assigned the pool of the pool ID selected in the pool input column 312 together with the host ID of the host computer 2 that will access those volumes, it is possible to input the intended target response performance of each volume. Note that a target response performance of a volume with no intended target response performance is represented with the value of "Not set". In the uppermost row of the target response performance input column 313, for instance, "0.5 [ms]" is set as the target response performance to the volume of volume ID "VOL 1" to be accessed by the host computer 2 of host ID "Host A".

Meanwhile, the analysis condition setting screen 300 includes a radio button 321 which enables input to the analysis mode I input column 320, a radio button 331 which enables input to the analysis mode II input column 330, and a radio button 341 which enables input to the analysis mode III input column 340.

In the analysis mode I input column 320, the last day of the target achievement retention period in relation to the analysis mode I which displays the required expansion capacity can be set. In the analysis mode II input column 330, the last day of the target achievement retention period in relation to the analysis mode II which displays the volume migration plan can be set. In the analysis mode III input column 340, the expansion capacity for each tier of each tier ID can be set as the scheduled expansion capacity in relation to the analysis mode III which displays the target shortfall volume.

The analysis execution button 350 is an operation button for performing the analysis described later based on the analysis condition that was input as described above.

Meanwhile, the analysis result screen 400 shown in FIG. 5 includes an analysis result main display column 410, an expansion capacity display column 420 and a volume migration plan display column 430. On the analysis result screen, the foregoing analysis result display unit 111 displays the analysis result based on the analysis result table 112.

The analysis result main display column 410 on the analysis result screen displays, for each timing, the volume ID of the volume that was subject to response performance degradation and the volume ID of the volume in which the target response performance fell short due to the decrease in the total capacity of the storage device 20 configured from a flash drive and the like. The expansion capacity display column 420 displays the analysis result only when the analysis mode I has been selected on the data input screen. The expansion capacity display column 420 displays the expansion capacity and the expansion time limit for each tier of each tier ID of the pool of the pool ID created in the storage apparatus of the storage apparatus ID.

The volume migration plan display column 430 displays the analysis result only when the analysis mode II has been selected on the data input screen. The volume migration plan display column 430 displays the storage apparatus ID of the migration destination storage apparatus and the pool ID of the migration destination pool to which the volume of the volume ID assigned to the pool of the pool ID created in the storage apparatus of the storage apparatus ID is to be migrated.

FIG. 6 is a diagram showing an example of the analysis condition table 200. An example of the analysis condition is being managed in the analysis condition table 200, and, as described above, a new analysis condition is registered and a previously registered analysis condition is updated by the analysis condition setting unit 102. The illustrated example shows a setting in which the analysis mode I is applied and analysis is performed to the analysis target having a storage apparatus ID of "Storage A" and a pool ID of "Pool A".

FIG. 7 to FIG. 9 are diagrams respectively showing an example of the volume target response performance table 220, the target retention time limit table 221 and the expansion capacity table 222. An example of the analysis condition input in the target response performance input column 313, the analysis mode I input column 320, the analysis mode II input column 330 and the analysis mode III input column 340 of the analysis condition setting screen 300 among the analysis conditions is being managed in the volume target response performance table 220, the target retention time limit table 221 and the expansion capacity table 222, and a new analysis condition is registered and a previously registered analysis condition is updated by the analysis condition setting unit 102. In the volume target response performance table 220, a target response performance 220B of a volume ID 220A assigned to each volume is being managed.

In the target retention time limit table 221, a time limit (this is hereinafter also referred to as the "target retention time limit") 221A in which the retention of achievement of the performance target has been requested is being managed. In the expansion capacity table 222, a capacity 222B which can be expanded in the tiers corresponding to each tier ID 222A (for example, Tier 1, Tier 2) in the pools which were tiered in the respective tiers for extending the time limit that the achievement of the performance target can be retained is being managed.

FIG. 10 to FIG. 18 are diagrams respectively showing an example of the table groups configuring the information acquired from the plurality of storage apparatuses 3 and stored in the storage apparatus information storage unit 101 by the storage apparatus information storage unit 101. These respectively represent an example of a storage apparatus table 230, a pool table 231, a pool configuration tier table 232, a volume table 233, a volume capacity information table 234, a flash drive table 235, a drive flash count table 236, a page table 237 and a page load table 238.

The storage apparatus table 230 registers the storage apparatus IDs of all storage apparatuses 3 to be managed by the management computer 4. The pool table 231 stores the storage apparatus ID of the storage apparatus 3 in which the pools of each pool ID 231A have been created. The pool configuration tier table 232 registers, for each pool ID 232B of the pool to which the tier of each tier ID 232A belongs and a storage apparatus ID 232C of the storage apparatus, a response time 232D and an allocated capacity 232E of the storage apparatus 20 assigned to that tier.

The volume table 233 registers, for each volume of each volume ID 233A, a storage apparatus ID 233B of the storage apparatus and a pool ID 233C of the pool assigned to that volume, as well as a connection destination host ID 233D of the host computer 2 which will access that volume. The volume capacity information table 234 registers a year/month 234A, a volume ID 234B, a storage apparatus ID 234C, a pool ID 234D, an allocated capacity 234E and a used capacity 234F.

The flash drive table 235 registers a drive ID 235A, a storage apparatus ID 235B, an allocated pool ID 235C, a capacity 235D, an allocated tier ID 235E and a flash limit count 235F.

The drive flash count table 236 registers a drive ID 236A, a storage apparatus ID 236B, a time 236C and a flash count 236D. The page table 237 registers a page ID 237A, a tier ID 237B, a pool ID 237C, a storage apparatus ID 237D, a volume ID 237E and a page size 237F. The page load table 238 registers a year/month 238A, a page ID 238B, a pool ID 238C, a storage apparatus ID 238D and an IOPS 238E.

FIG. 19 to FIG. 24 are diagrams respectively showing an example of the flash count upper limit reach timing table 201, the tier capacity estimation table 202, the page load estimation table 204, the page arrangement destination tier table 203, the response performance degradation volume table 205 and the volume response performance table 206.

The flash count upper limit reach timing table 201 manages a flash count upper limit reach timing 201B for each drive ID 201A, and the flash count upper limit reach timing 201B is updated or added for each drive ID 201A by the foregoing drive flash count upper limit reach timing estimation unit 104. In the tier capacity estimation table 202, the capacities of the respective tiers; for instance, a capacity 202B of Tier 1 and a capacity 202C of Tier 2, are being managed for each year/month 202A.

The page load estimation table 204 manages a year/month 204A, a page ID 204B and an IOPS 204C, and manages the IOPS (I/O count per second) of each page in a certain year/month.

The page arrangement destination tier table 203 manages a year/month 203A, a page ID 203B and a tier ID 203C, and the year/month 203A, the page ID 203B and the tier ID 203C are updated or added by the page arrangement destination tier identification unit 105.

The response performance degradation volume table 205 manages a year/month 205A and a volume ID 205B, and manages the volumes in which the response performance is expected to start degrading as a result of the total capacity of the storage device 20 configured from a flash drive and the like of each tier decreasing and the tier to which the pages configuring the volume are assigned being migrated to a low performance tier in the year/month of the year/month 205A. In the response performance degradation volume table 205, the year/month 205A and the volume ID 205B are updated or added by the volume response performance degradation timing estimation unit 106.

The volume response performance table 206 manages a year/month 206A, a volume ID 206B and a response performance 206C, and manages the response performance of the volume in a certain year/month based on the year/month 206A, the volume ID 206B and the response performance 206. In the volume response performance table 206, the year/month 206A, the volume ID 206B and the response performance 206C are updated or added by the volume response performance estimation unit 107.

FIG. 25 to FIG. 28 are diagrams respectively showing an example of the target shortfall volume table 207, the analysis result table 240, the required expansion capacity table 208 and the volume migration plan table 209.

The target shortfall volume table 207 manages a year/month 207A and a volume ID 207B, and manages the volumes in which the response performance is expected to fall short of the target response performance as a result of the total capacity of the storage device 20 configured from a flash drive and the like of each tier decreasing and the tier to which the pages configuring the volume are assigned being migrated to a low performance tier in a certain year/month. In the target shortfall volume table 207, the year/month 207A and the volume ID 207B are updated or added by the volume target response performance shortfall timing estimation unit 108.

The analysis result table 240 manages a year/month 240A, a performance degradation volume 240B and a target shortfall volume 240C, and manages the volumes in which the response performance is expected to start degrading and the volumes in which the response performance is expected to fall short of the target response performance in a certain year/month.

The required expansion capacity table 208 manages a tier ID 208A, a required expansion capacity 208B and an expansion time limit 208C, and manages the expansion capacity required in a certain tier of the pool and the time limit of such expansion of capacity. In the required expansion capacity table 208, the tier ID 208A, the required expansion capacity 208B and the expansion time limit 208C are updated or added by the analysis mode I processing unit 109.

The volume migration plan table 209 manages a volume ID 209A, a migration destination storage apparatus ID 209B and a migration destination pool ID 209C, and manages the migration plan of volumes. In the volume migration plan table 209, the volume ID 209A, the migration destination storage apparatus ID 209B and the migration destination pool ID 209C are updated or added by the analysis mode II processing unit 110.

Figure 30:
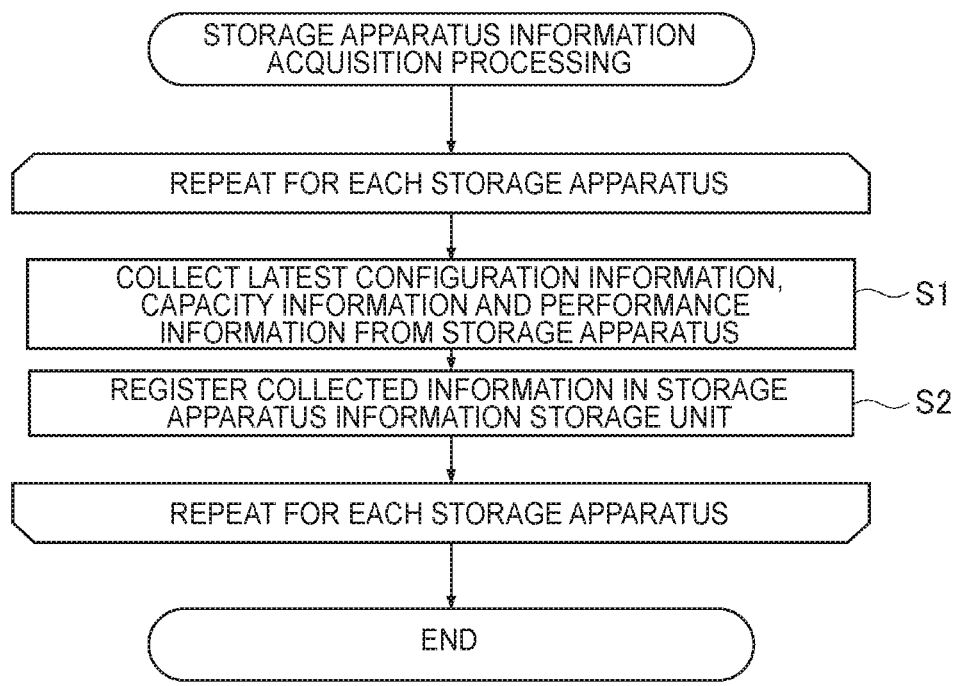
FIG. 30 is a flowchart showing an example of the storage apparatus information acquisition processing.

(5) Performance Analysis Method (5-1) Storage Apparatus Information Acquisition Processing FIG. 30 shows an example of the storage apparatus information acquisition processing that is being constantly executed. In this storage apparatus information acquisition processing, foremost, the storage apparatus information collection unit 100 collects the latest configuration information, capacity information and performance information from the respective storage apparatuses 3 (step S1). Next, the storage apparatus information collection unit 100 registers the collected storage apparatus information in the storage apparatus information storage unit 101. In this storage apparatus information acquisition processing, the storage apparatus information collection unit 100 repeatedly executes foregoing steps S1 and S2 for each storage apparatus 3.

(5-2) Information Collection/Estimation/Result Display Processing

Figure 29:
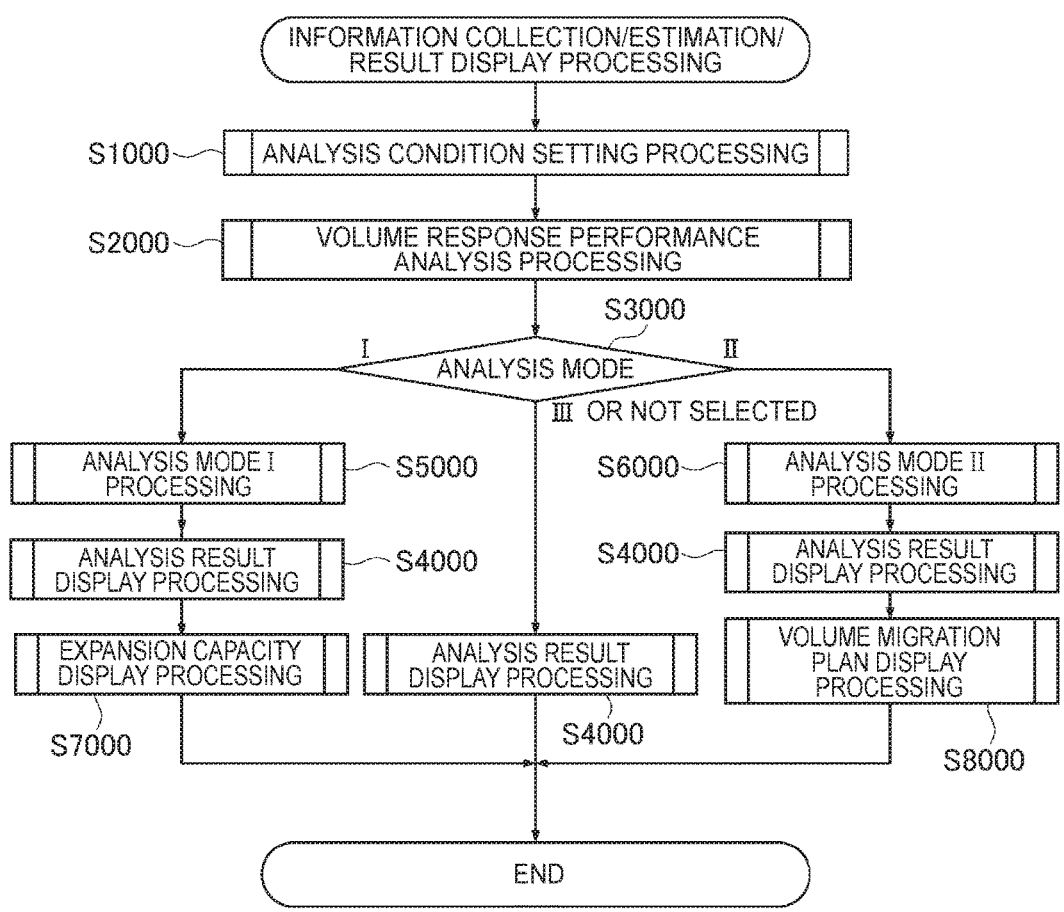
FIG. 29 is a flowchart showing an example of the information collection/estimation/result display processing.
Figure 31:
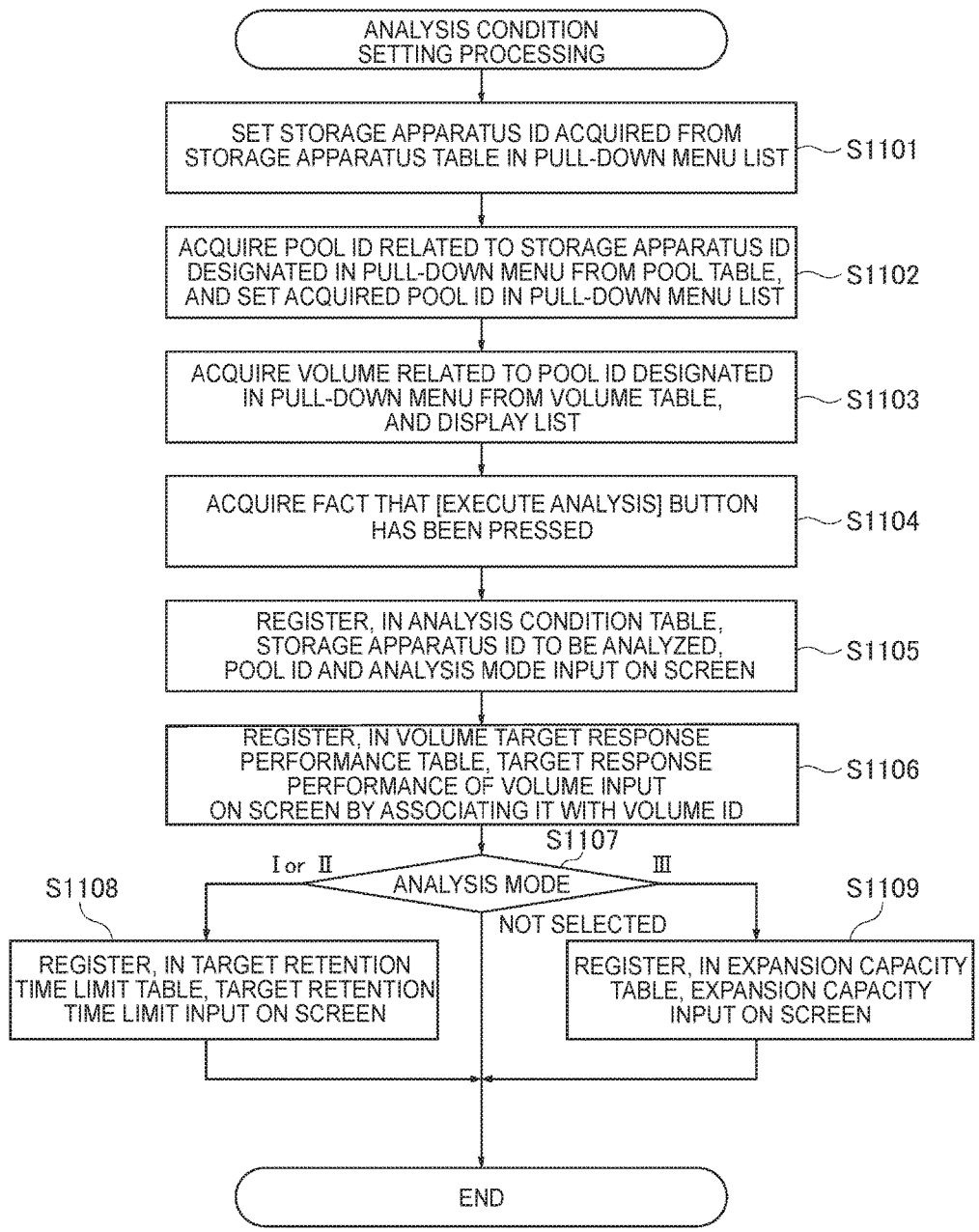
FIG. 31 is a flowchart showing an example of the analysis condition setting processing.
Figure 32:
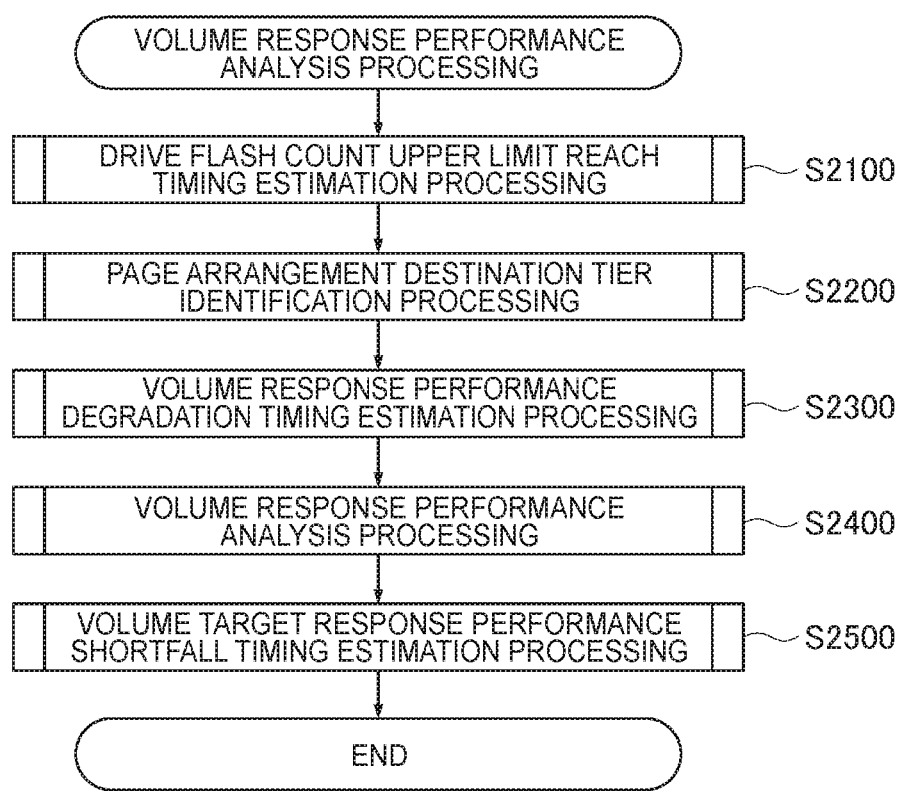
FIG. 32 is a flowchart showing an example of the volume response performance analysis processing.
Figure 33:
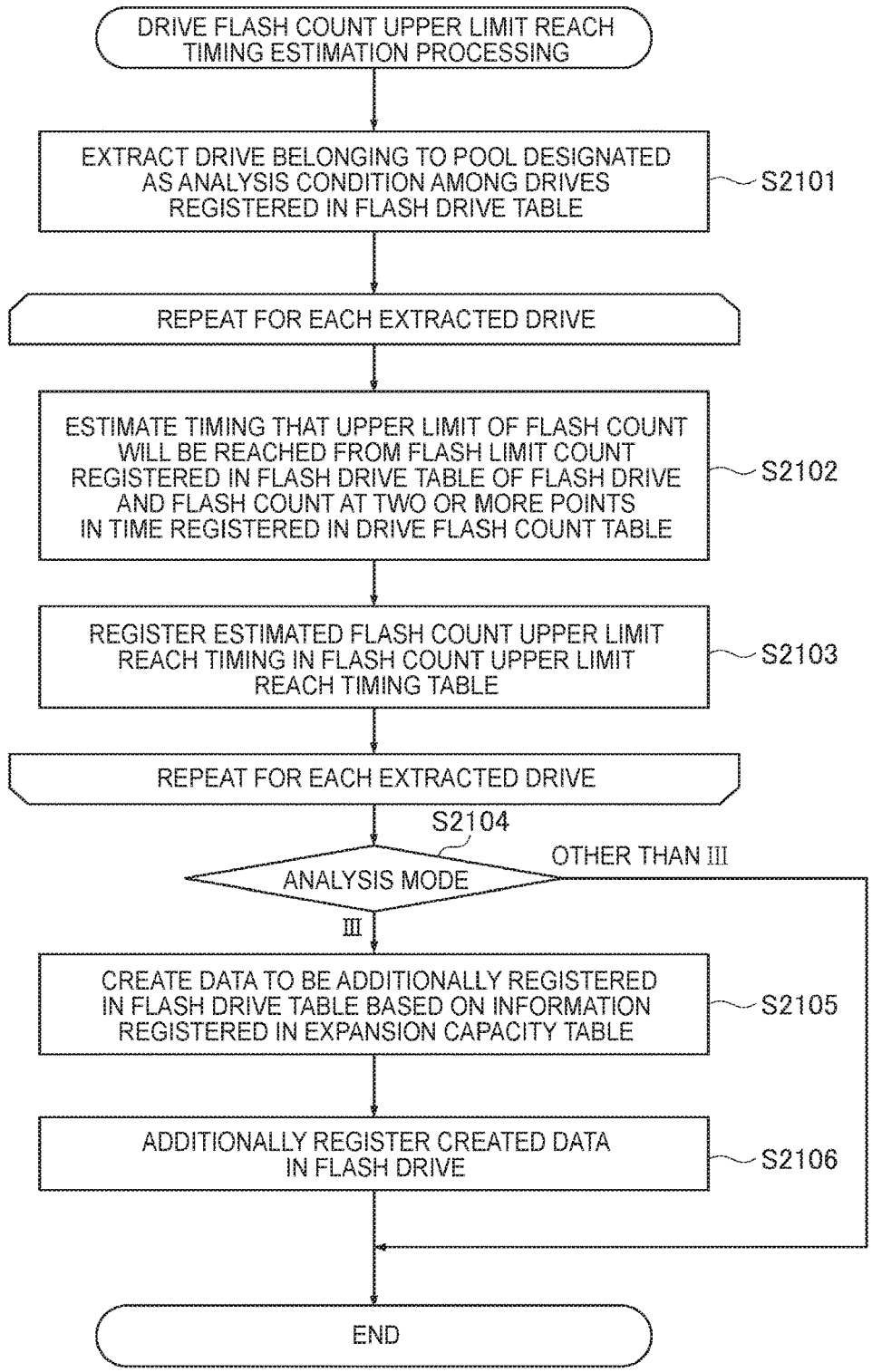
FIG. 33 is a flowchart showing an example of the drive flash count limit reach timing estimation processing.

FIG. 29 is a flowchart showing an example of the information collection/estimation/result display processing. FIG. 31 is a flowchart showing an example of the analysis condition setting processing S1000 shown in FIG. 29. FIG. 32 is a flowchart showing an example of the volume response performance analysis processing S2000 shown in FIG. 29. FIG. 33 to FIG. 39 are flowcharts specifically showing the respective processing (S2100, S2200, S2220, S2230, S2300, S2400 and S2500) shown in FIG. 32 and FIG. 34.

In the management computer 4, the processor 30 executes the analysis condition setting processing (S1000). In this analysis condition setting processing, the processor 30 sets the storage apparatus ID acquired from the storage apparatus ID 230A of the storage apparatus table 230 in the pull-down menu list of the storage apparatus input column 311 in the common input column 310 on the analysis condition setting screen shown in FIG. 4 (FIG. 31; step S1101). In FIG. 4, "Storage A" is displayed as an example in the storage apparatus input column 311 as a state after the user selected the storage apparatus ID from the pull-down menu list.

Next, the processor 30 acquires, from the pool table 231 (refer to FIG. 11), the pool ID related to the storage apparatus ID designated in the storage apparatus input column 311, and sets the acquired pool ID in the pull-down menu list of the pool input column 312 (step S1102).

Next, the processor 30 acquires, from the volume table 233 (refer to FIG. 13), the volume ID of the volume related to the pool ID designated in the pool input column 312 and the connection destination host ID, and displays a list thereof (step S1103).

Next, when the processor 30 detects that the analysis execution button 350 has been pressed (step S1104), the processor 30 registers, in the analysis condition table 200 (refer to FIG. 6), the storage apparatus ID, the pool ID and the analysis mode of the analysis target which were input on the analysis condition setting screen shown in FIG. 4 (step S1105).

Next, the processor 30 associates the target response performance of the volume, which was input on the analysis condition setting screen, with the volume ID, and registers the association in the volume target response performance table 220 (refer to FIG. 7) (step S1106).

Next, the processor 30 executes processing by dividing the processing as follows according to the analysis mode. In other words, when the analysis mode is I or II, the processor 30 registers, in the target retention time limit table 221 (refer to FIG. 8), the target retention time limit that was input on the analysis condition setting screen (step S1108), and then ends the processing. When the analysis mode is III, the processor 30 registers, in the expansion capacity table 222 (refer to FIG. 9), the expansion capacity that was input on the analysis condition setting screen (step S1109), and then ends the processing. Meanwhile, when an analysis mode has not been selected, the processor 30 ends the processing.

Next, in the management computer 4, the processor 30 executes the drive flash count upper limit reach timing estimation processing S2100, the page arrangement destination tier identification processing S2200, the volume response performance degradation timing estimation processing S2300, the volume response performance analysis processing S2400 and the volume target response performance shortfall timing estimation processing S2500 shown in FIG. 32 as the specific processing of the volume response performance analysis processing S2000 shown in FIG. 29.

Specifically, the processor 30 foremost extracts the drive IDs of the drives belonging to the pool of the pool ID designated as the analysis condition among the drives corresponding to the drive IDs registered in the flash drive table 235 (refer to FIG. 15) (step S2101).

Next, the processor 30 selects one drive ID extracted in step S2101, and thereafter estimates the timing that the upper limit of the flash count will be reached in the future (this is hereinafter also referred to as the "flash count upper limit reach timing") based on the flash limit count registered in the flash drive table 235 (refer to FIG. 15) and the flash count at two or more points in time registered in the drive flash count table 236 (refer to FIG. 16) with regard to the flash drive of the selected drive ID (step S2102).

Specifically, when the flash counts at the two points in time of T1 and T2 are respectively F1 and F2, and the flash limit count is Fx, the estimation value Tx of the flash count upper limit reach timing can be obtained based on following Formula (1).

$$Tx = T2 + (T2-T1) \times (Fx-F2)/(F2-F1) \quad (1)$$

Furthermore, when it is possible to use the flash counts at three or more points in time, the least-square method and other estimation means may also be used.

Next, the processor 30 registers the estimated flash count upper limit reach timing in the flash count upper limit reach timing table 201 (refer to FIG. 19) (step S2103). The processor 30 repeated executes foregoing step S2102 and step S2103 for all drives that were extracted in step S2101 (step S2104).

Next, the processor 30 ends the processing when the analysis mode is not III. Meanwhile, when the analysis mode is III, the processor 30 creates data to be additionally registered in the flash drive table 235 (refer to FIG. 15) based on the information registered in the expansion capacity table 222 (refer to FIG. 9) (step S2105). Note that the drive ID is arbitrarily set within a unique range. As the flash limit count, the same value as the drive belonging to the same tier ID is set.

Next, the processor 30 additionally registers the created data in the flash drive table 235 (step S2106).

Next, the processor 30 executes the page arrangement destination tier identification processing described above. The processor 30 selects, in order, one flash drive with the earliest flash count upper limit reach timing among the flash drives registered in the flash count upper limit reach timing table 201, thereafter subtracts the capacity of that drive from the allocated capacity of the tier to which that drive belongs among the pool configuration tiers registered in the pool configuration tier table 232 (refer to FIG. 12), associates the result with the flash count upper limit reach timing, and registers the association in the tier capacity estimation table 202 (refer to FIG. 20) (step S2210). Here, let it be assumed that, with regard to the allocated capacity of the tiers to which that drive does not belong, the allocated capacity of the tiers to which that drive belongs among the pool configuration tiers registered in the pool configuration tier table 232 (refer to FIG. 12) is registered in the tier capacity estimation table 202 (refer to FIG. 20) at the initial stage of repetition, and the allocated capacity that was registered in the preceding repetition is subsequently registered in the tier capacity estimation table 202 (refer to FIG. 20). The processor 30 repeats foregoing step S2210 for all flash drives registered in the flash count upper limit reach timing table 201 in order from the flash drive with the earliest flash count upper limit reach timing.

Figure 34:
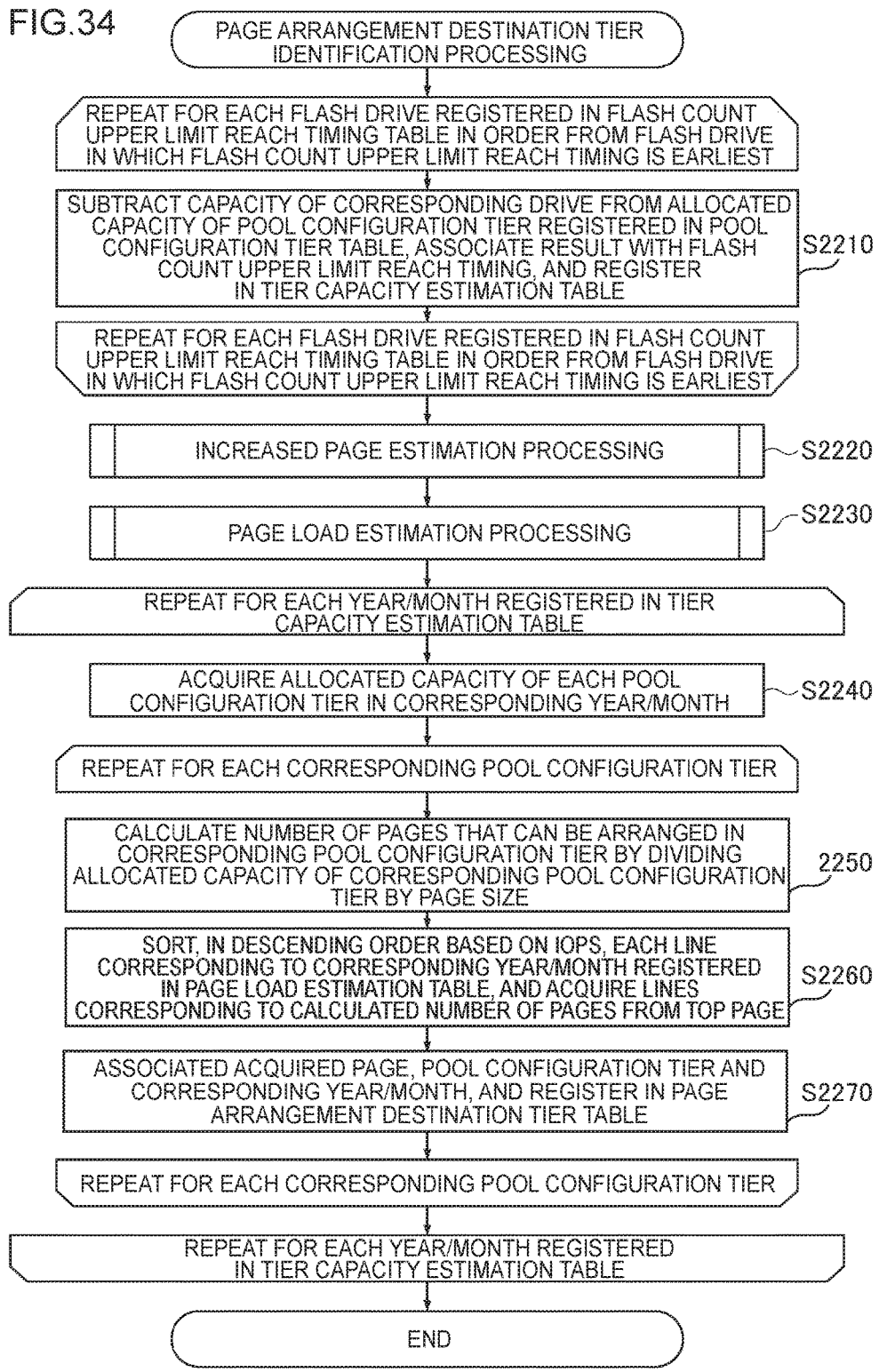
FIG. 34 is a flowchart showing an example of the page arrangement destination tier identification processing.
Figure 35:
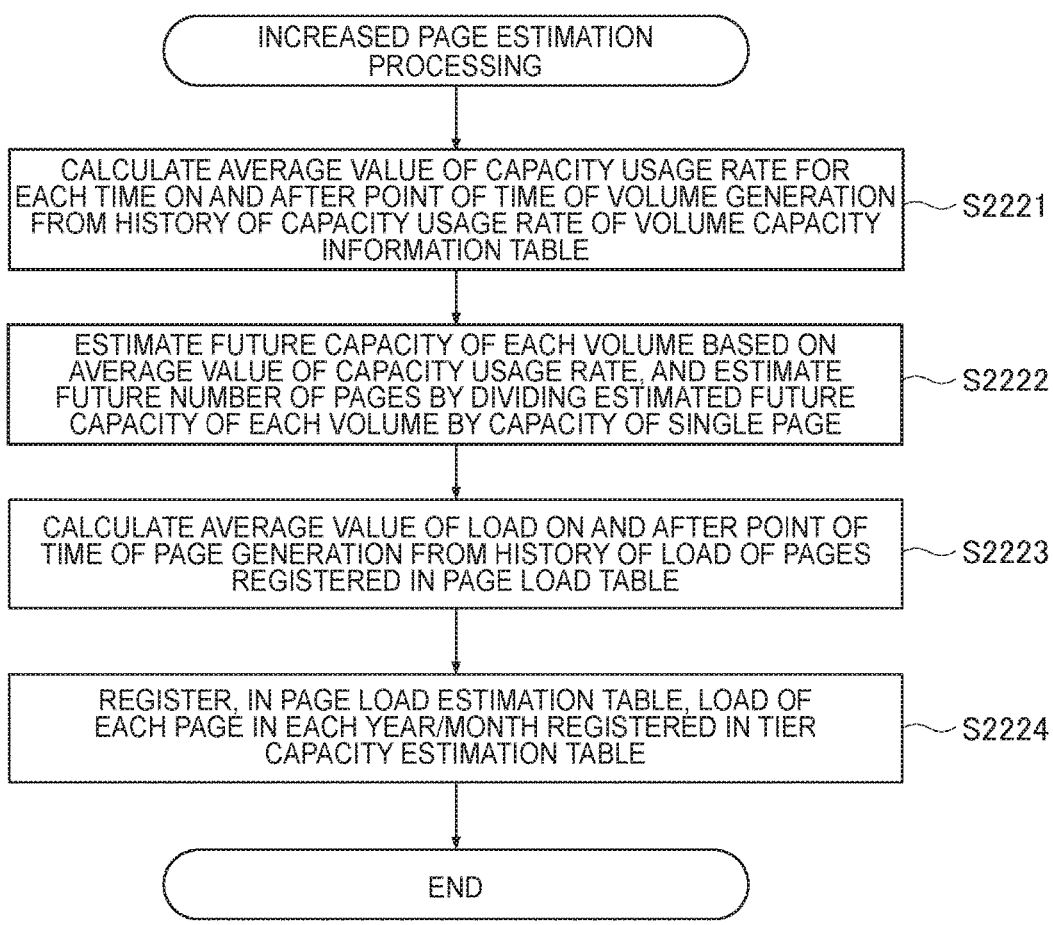
FIG. 35 is a flowchart showing an example of the increased page estimation processing.

Next, the processor 30 executes the increased page estimation processing shown in FIG. 34 (step S2220). Specifically, the processor 30 calculates the average value of the capacity usage rate for each elapsed time from the time that the volume was created based on the history of the capacity usage rate (ratio of used capacity and allocated capacity) of the volume capacity information table 234 (refer to FIG. 14) as shown in FIG. 35 (step S2221). Here, the volumes for which the average value is to be calculated may be all volumes registered in the volume capacity information table 234, or may be narrowed to the volumes that are common from the following perspectives (A) to (C).

(A) Volume Allocation Destination Pool

In the management computer 4, the processor 30 refers to the volume table 233 shown in FIG. 13, and narrows down the volumes to those belonging to the pool of the pool ID to be analyzed.

(B) Performance Information of Volume (Read Count, Write Count, Etc.)

The processor 30 periodically collects the performance information of volumes and stores the collected performance information in the storage apparatus information storage unit 101, and narrows down the volumes to those in which the most recent values of the performance information or the average values of the performance information during a predetermined period are similar.

(C) Business for which the Volumes are being Used (Email Server, Online Transaction Processing Business Server, Batch Processing Business Server or the Like)

In addition to the connection destination host ID of the volume table 233, the processor 30 stores information representing the business type of the connection destination host in the storage apparatus information storage unit 101, and narrows down the volumes based on the business type information.

Next, the processor 30 estimates the future capacity of the respective volumes based on the average value of the capacity usage rate for each elapsed time from the time that the volume was created, divides the obtained result by a single page capacity to estimate how many pages will be newly assigned to that volume at what point in time in the future, and sets an arbitrary page ID within a unique range to the pages that will be added in the future (step S2222). Next, the processor 30 calculates the average value of the load (IOPS or the like) for each elapsed time from the time that the page was created based on the history of the load (IOPS or the like) of the page registered in the page load table 238, and estimates the load (IOPS or the like) after the respective pages, which were estimated as being added in the future in step S2222, have been added (step S2223). Next, the processor 30 registers, in the page load estimation table 204 (refer to FIG. 21), the value in each year/month registered in the tier capacity estimation table 202 (refer to FIG. 20) among the loads (IOPS or the like) estimated in step S2223 with regard to the respective pages which were estimated as being added in the future in step S2222 (step S2224).

Figure 36:
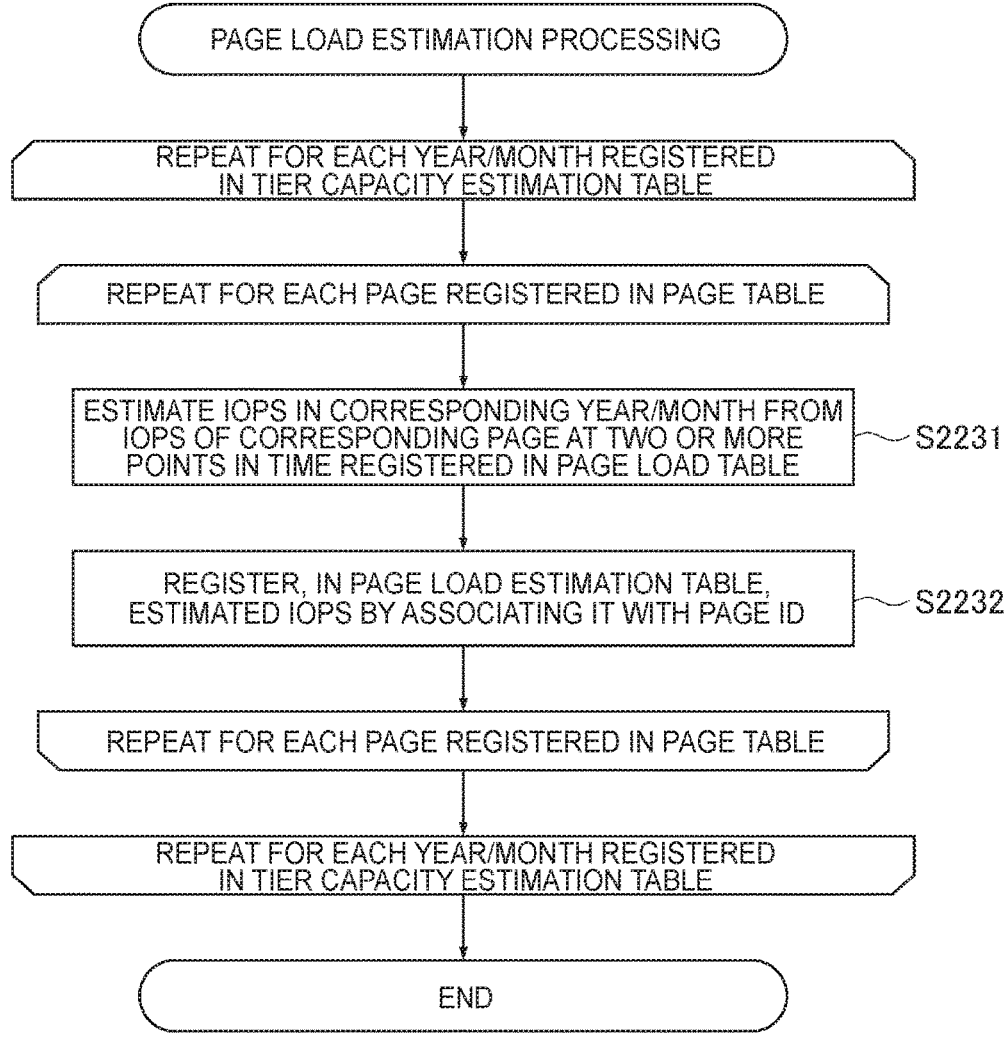
FIG. 36 is a flowchart showing an example of the page load estimation processing.

Next, the processor 30 executes the page load increase estimation processing shown in FIG. 34 (step S2230). Specifically, the processor 30 foremost selects, in order, one year/month which is the oldest among the years/months registered in the tier capacity estimation table 202 (refer to FIG. 20) as shown in FIG. 36. Next, the processor 30 arbitrarily selects one page ID among the page IDs registered in the page table 237 (refer to FIG. 17), and estimates the load (IOPS or the like) of the corresponding page in the corresponding year/month based on the load (IOPS or the like) of that page at two or more points in time registered in the page load table 238 (refer to FIG. 18) (step S2231). Specifically, the foregoing estimation is performed using the least-square method or other estimation means. Next, the processor 30 associates the estimate load (IOPS or the like) with the corresponding year/month and page ID, and registers the association in the page load estimation table 204 (refer to FIG. 21) (step S2232).

The processor 30 repeatedly executes foregoing step S2231 and step S2232 for all pages that are registered in the page table 237 (refer to FIG. 17). The processor additionally repeatedly executes step S2231 and step S2232, which were repeatedly executed for the pages registered in the page table 237 (refer to FIG. 17), for all years/months of the year/month column 202A registered in tier capacity estimation table 202 in order from the oldest year/month.

Next, the processor 30 selects, in order, one year/month which is the oldest among the years/months registered in the tier capacity estimation table 202 (refer to FIG. 20), and acquires the allocated capacity of each pool configuration tier in that year/month as shown in FIG. 34 (step S2240). Next, the processor 30 selects, in order, one upper tier among the pool configuration tiers, and divides the allocated capacity of the pool configuration tier by the page size to calculate the number of pages that can be assigned to the pool configuration tier (step S2250). Next, the processor 30 sorts, in descending order based on IOPS, each line corresponding to that year/month registered in the page load estimation table 204 (refer to FIG. 21), and acquires the number of pages that can be assigned to the corresponding tier, as calculated above, from the top page (step S2260). However, pages that have previously been acquired in this repetitive processing are excluded. Next, the processor 30 associates the acquired pages and the pool configuration tier with the corresponding year/month, and registers the association in the page arrangement destination tier table 203 (refer to FIG. 22) (step S2270). The processor 30 repeatedly executes foregoing step S2250 to step S2270 regarding all tiers of the pool configuration tier in order from the upper tier.

Furthermore, the processor 30 repeated executes foregoing step S2250 to step S2270, including step S2240 described above, which were repeatedly executed for all tiers of the pool configuration tier, regarding all years/months registered in the tier capacity estimation table 202 (refer to FIG. 20) in order from the oldest year/month.

Figure 37:
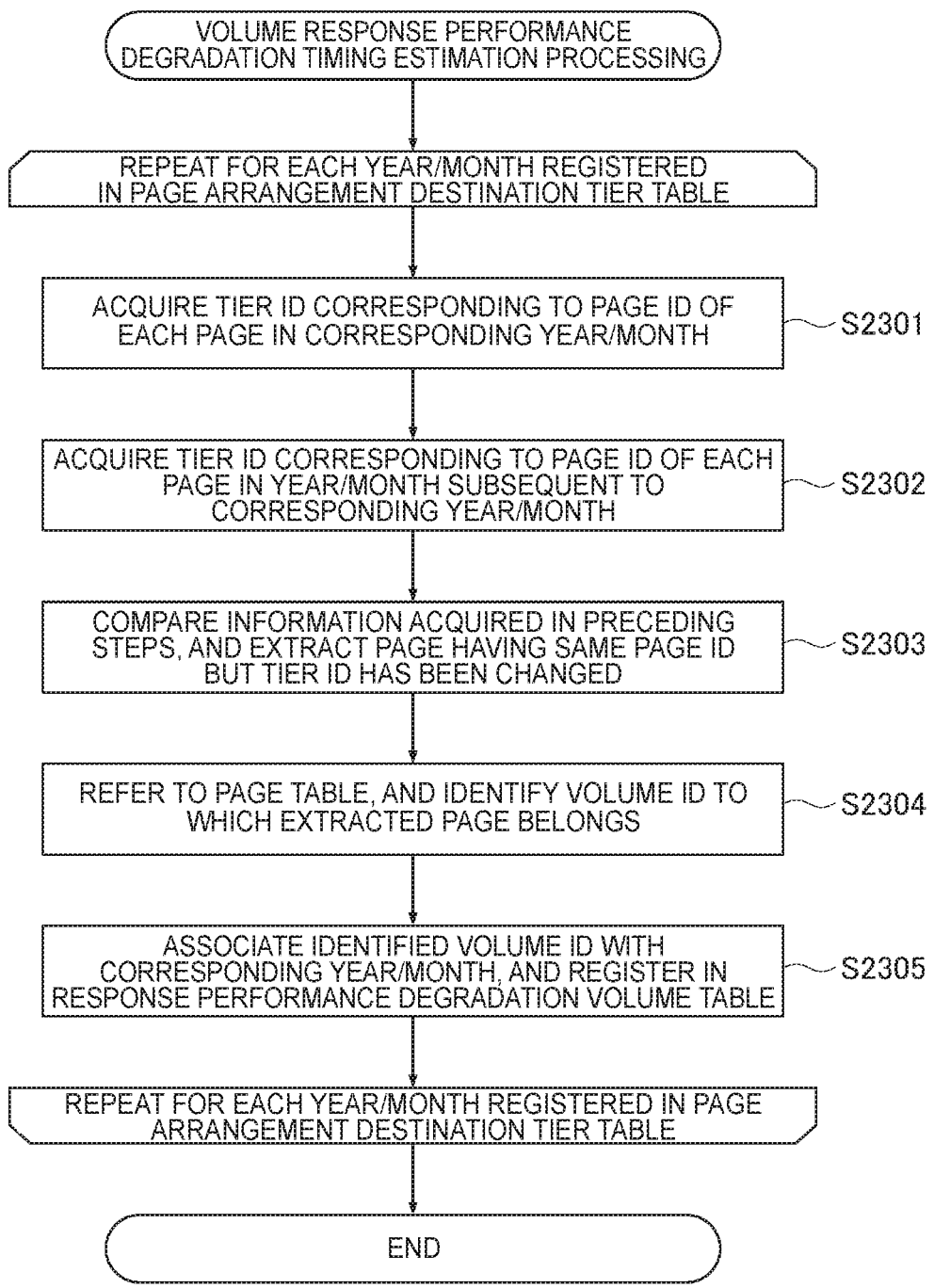
FIG. 37 is a flowchart showing an example of the volume response performance degradation timing estimation processing.

Next, the processor 30 executes the volume response performance degradation timing estimation processing S2300 shown in FIG. 32 in the manner depicted in FIG. 37. The processor 30 selects, in order, one year/month which is the oldest among the years/months registered in the page arrangement destination tier table 203 (refer to FIG. 22), and acquires, from the arrangement destination tier table 203 (refer to FIG. 22), the tier ID corresponding to the page ID of each page in the corresponding year/month (step S2301). Next, the processor 30 acquires, from the page arrangement destination tier table 203 (refer to FIG. 22), the tier ID corresponding to the page ID of each page in the year/month which is subsequent to the corresponding year/month (step S2302). Next, the processor 30 compares the information acquire in step S2301 and the information acquired in step S2302 as described above, and selects and extracts the page having the same page ID and in which the tier ID has been changed (step S2303).

Next, the processor 30 refers to the page table 237 (refer to FIG. 17), and identifies the volume ID of the volume to which the page selected and extracted in step S2303 belongs (step S2304). Next, the processor 30 associates the volume ID identified in step S2304 with the corresponding year/month, and registers the association in the response performance degradation volume table 205 (refer to FIG. 23) (step S2305). The processor 30 repeatedly executes foregoing step S2301 to step S2305 for all years/months registered in page arrangement destination tier table 203 (refer to FIG. 22) in order from the oldest year/month.

Figure 38:
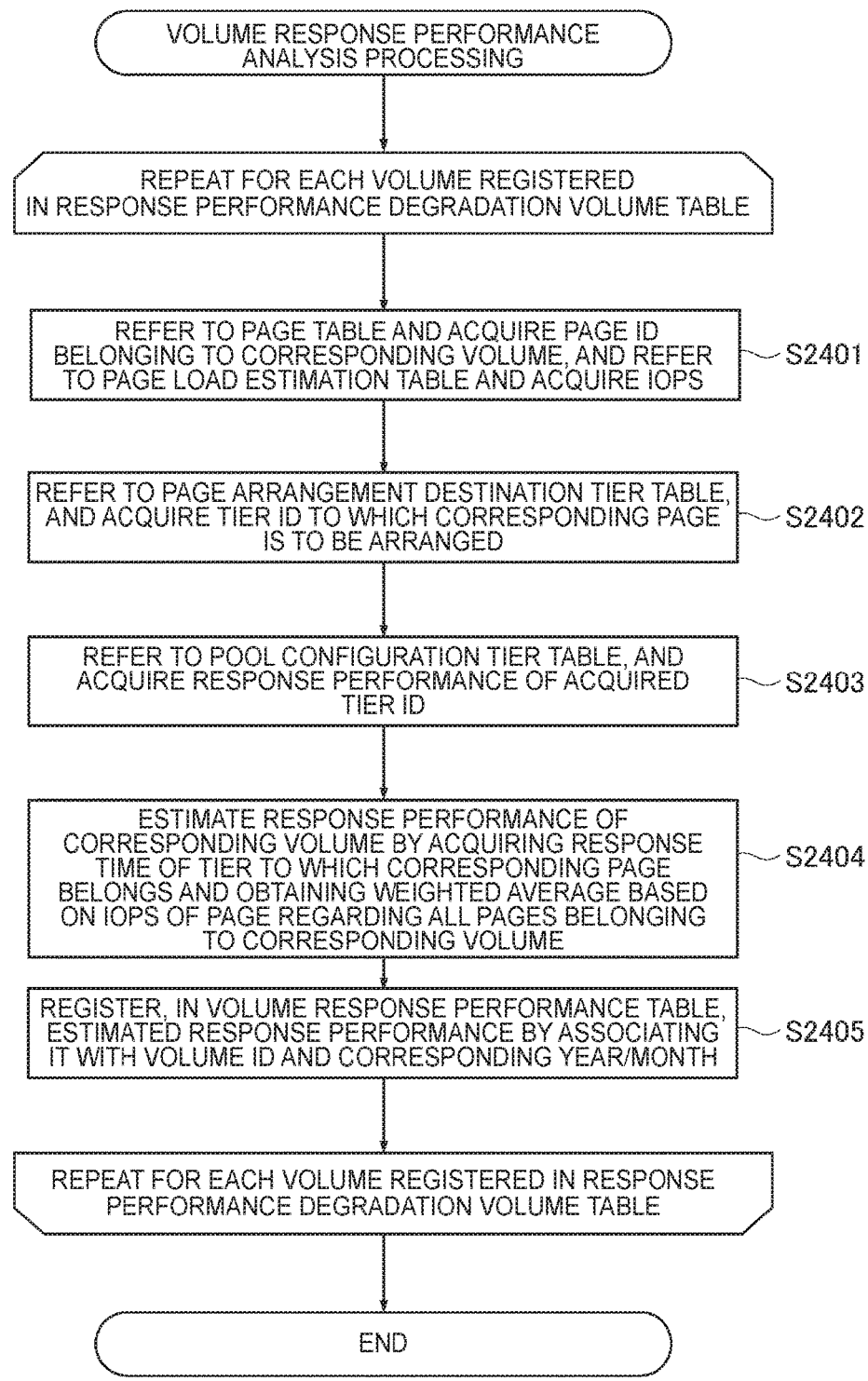
FIG. 38 is a flowchart showing an example of the volume response performance analysis processing.

Next, the processor 30 executes the volume response performance analysis processing S2400 shown in FIG. 32 in the manner depicted in FIG. 38. The processor 30 selects one volume among the volumes registered in the response performance degradation volume table 205 (refer to FIG. 23), refers to the page table 237 (refer to FIG. 17) and acquires the page ID of all pages belonging to the corresponding volume, and refers to the page load estimation table 204 (FIG. 21) and acquires the IOPS in each year/month of all pages belonging to the corresponding volume (step S2401). Next, the processor 30 refers to the page arrangement destination tier table 203 (refer to FIG. 22), and identifies the tier to which the respective pages acquired in step S2401 are to be assigned (step S2402). Next, the processor 30 refers to the pool configuration tier table 232 (refer to FIG. 12) and acquires the response performance of the tier identified in step S2402 (step S2403).

Next, the processor 30 uses following Formula (2) and estimates the response performance of the corresponding volume for each year/month by obtaining the weighted average of the response time of the tier to which the pages belong based on the IOPS of the pages with regard to all pages belonging to the corresponding volume (step S2404).

$$\frac{\Sigma^{page}(\text{Response Time}_{Tier_{page_i}} \times IOPS_{page_i})}{\Sigma^{page}(IOPS_{page_i})} \qquad (2)$$

Next, the processor 30 associates the estimation response performance of the corresponding volume with the volume ID and the corresponding year/month, and registers the association in the volume response performance table 206 (refer to FIG. 24) (step S2405).

The processor 30 repeats foregoing step S2401 to step S2405 for all volumes registered in the response performance degradation volume table 205 (refer to FIG. 23).

Figure 39:
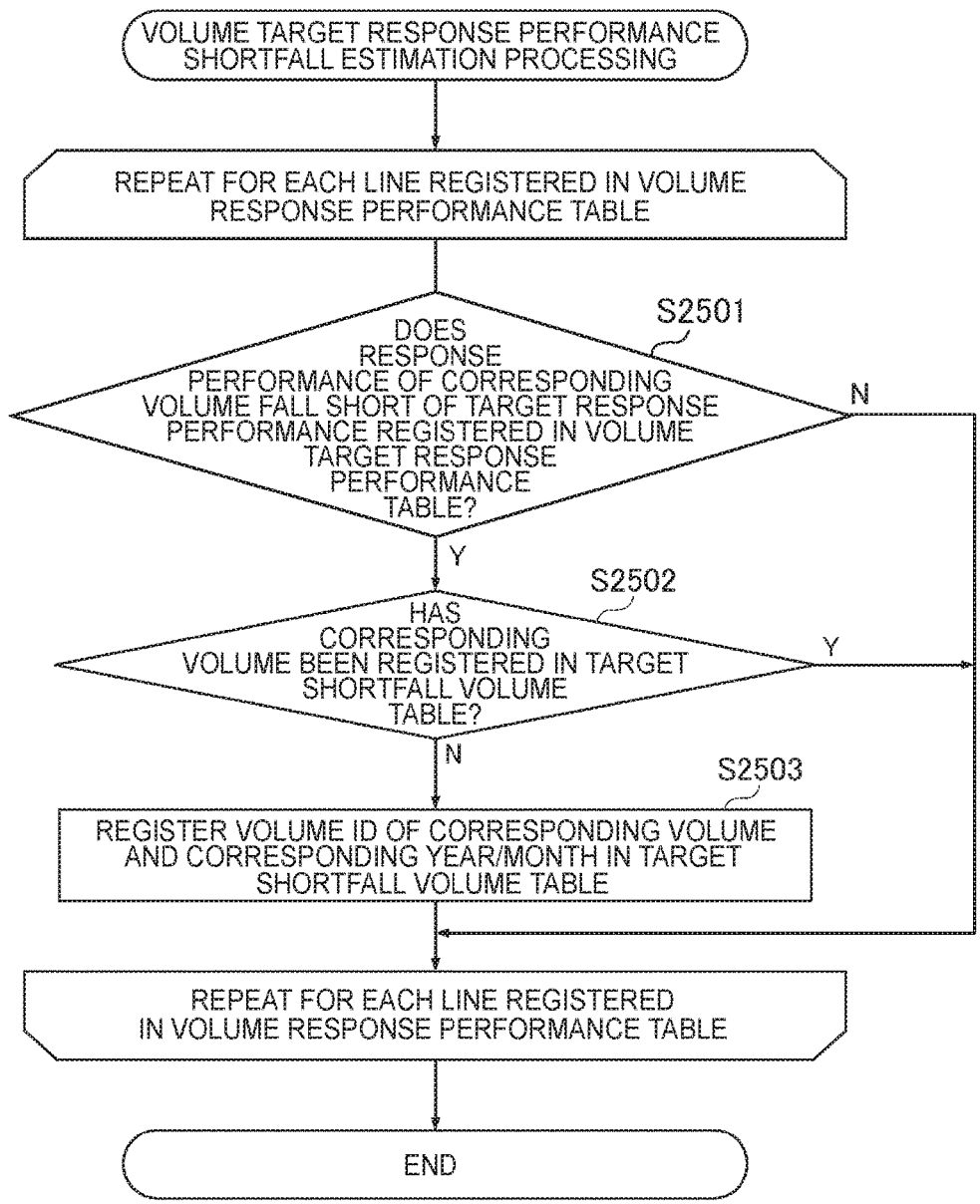
FIG. 39 is a flowchart showing an example of the volume target response performance shortfall timing estimation processing.

Next, the processor 30 executes the volume target response performance shortfall timing estimation processing S2500 shown in FIG. 32 in the manner depicted in FIG. 39. The processor 30 selects, in order, one response performance with the oldest year/month among the volumes in the line registered in the volume response performance table 206 (refer to FIG. 24), and determines whether the response performance of the volume of the corresponding line has fallen short of the target response performance registered in the volume target response performance table 220 (refer to FIG. 7) (step S2501).

When the response performance of the volume of the corresponding line has fallen short of the target response performance, the processor 30 determines whether or not the corresponding has been registered in the target shortfall volume table 207 (refer to FIG. 25) (step S2502), and, if not yet registered, registers the volume ID of the corresponding volume and the year/month of the corresponding line in the target shortfall volume table 207 (refer to FIG. 25) (step S2503).

When the processor 30 registers the volume ID of the corresponding volume and the year/month of the corresponding line in the target shortfall volume table 207 (refer to FIG. 25) in step S2503 as described above, when the response performance of the corresponding volume satisfies the target response performance in step S2501, or when the volume of the corresponding line has been registered in the volume ID of the corresponding volume and the year/month of the corresponding line in the target shortfall volume table 207 (refer to FIG. 25) in step S2503, the processor 30 repeatedly executes foregoing step S2501 to step S2503 for all lines registered in the volume response performance table 206 (refer to FIG. 24) in order from the line with the oldest year/month.

Meanwhile, when all of the processing included in the volume response performance analysis processing (step S2000) shown in FIG. 29 is completed as described above, the type of analysis mode is subsequently determined (step S3000). When the analysis mode is III or when an analysis mode has not been selected, the analysis result display processing is executed (step S4000).

Figure 40:
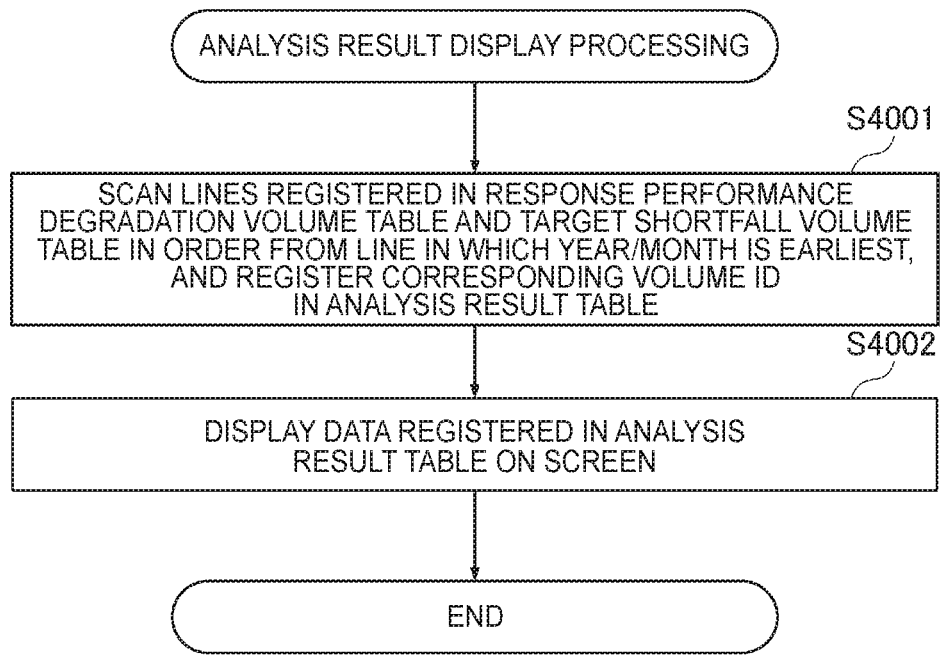
FIG. 40 is a flowchart showing an example of the analysis result display processing.

In this analysis result display processing, as shown in FIG. 40, in the management computer 4, the processor 30 scans the lines registered in the response performance degradation volume table 205 (refer to FIG. 23) and the target shortfall volume table 207 (refer to FIG. 25) in order from the line having the earliest year/month, and registers the corresponding year/month and volume ID in the analysis result table 240 (refer to FIG. 26) (step S4001).

Next, in the management computer 4, the processor 30 displays a screen of the data registered in the analysis result table 240 (step S4002), and then ends the processing.

Figure 41:
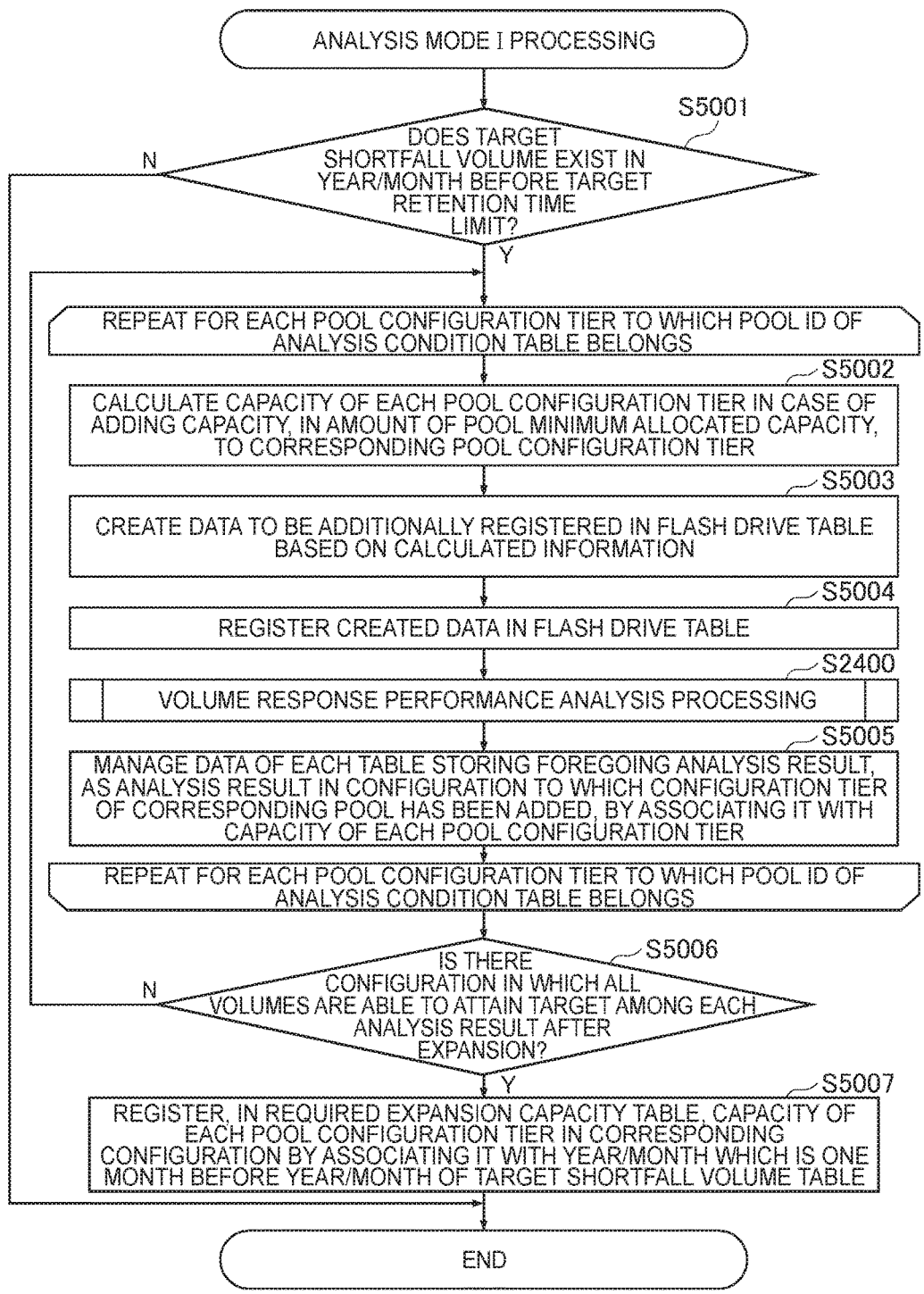
FIG. 41 is a flowchart showing an example of the analysis mode I processing.

Meanwhile, when the analysis mode is I, in the management computer 4, the analysis mode I processing unit 109 executes the analysis mode I processing based on the control of the processor 30 (FIG. 29; step S5000). In this analysis mode I processing, the analysis mode I processing unit 109, as shown in FIG. 41, foremost determines whether or not there is a volume in which the target performance will fall short in a year/month before the target retention time limit (specifically, whether or not a year/month before the target retention time limit, which has been registered in the target retention time limit table 221, is registered in the target shortfall volume table 207) (step S5001), and ends the analysis mode I processing when there is no target shortfall volume. Meanwhile, when there is a target shortfall volume, the analysis mode I processing unit 109 repeatedly executes the following processing regarding the pool configuration tier belonging to the pool of the pool ID of the analysis condition table 200.

In other words, the analysis mode I processing unit 109 calculates each pool configuration tier in the case of adding a capacity in the amount of the pool minimum allocation capacity (for example, capacity in the amount of an arbitrary number of storage devices assigned to the corresponding tier) to the corresponding pool configuration tier (step S5002). Next, the analysis mode I processing unit 109 creates data to be additionally registered in the flash drive table 235 (refer to FIG. 15) based on the calculated information for the number of storage devices corresponding to the pool minimum allocation capacity (step S5003). Note that, while the drive ID is arbitrarily set within a unique range, the flash limit count is set to the same value as the drive belonging to the same tier ID. Subsequently, the analysis mode I processing unit 109 registers the created data in the flash drive table 235 (step S5004).

Next, the volume response performance analysis processing described above is executed (step S2400).

Furthermore, the analysis mode I processing unit 109 manages the data of the respective tables storing the foregoing analysis result, as the analysis result in the configuration with the added pool configuration tier, by associating the data with the capacity of each pool configuration tier (step S5005). The analysis mode I processing unit 109 repeatedly executes foregoing step S5002 to step S5005 regarding the pool configuration tier belonging to the pool of the pool ID of the analysis condition table 200 as described above.

Here, the analysis mode I processing unit 109 determines whether or not there is a configuration in which all targets can achieve the target among the respective analysis results after the addition (specifically, whether or not there is a configuration in which a year/month before the target retention time limit, which has been registered in the target retention time limit table 221, is not registered in the target shortfall volume table 207) (step S5006). When the analysis mode I processing unit 109 determines that there is no such configuration, the analysis mode I processing unit 109 returns to the processing of repeatedly executing step S5002 to step S5005 regarding the pool configuration tier belonging to the pool of the pool ID of the analysis condition table 200. Meanwhile, when the analysis mode I processing unit 109 determines that there is such a configuration, the analysis mode I processing unit 109 executes the following processing. In other words, the analysis mode I processing unit 109 associates the difference capacity between the capacity of each pool configuration tier in the corresponding configuration and the capacity of each pool configuration tier in the initial configuration (before assigning the capacity in the amount of the pool minimum allocation capacity in step S5002) with the year/month that is one month before the oldest year/month registered in the target shortfall volume table 207 (refer to FIG. 25) in the initial configuration, registers the association in the required expansion capacity table 208 (refer to FIG. 27) (step S5007), and then ends this processing.

Furthermore, when the foregoing analysis mode I processing is ended, the analysis result display unit 111 executes the foregoing analysis result display processing (step S4000), and thereafter executes the expansion capacity display processing (step S7000).

Figure 43:
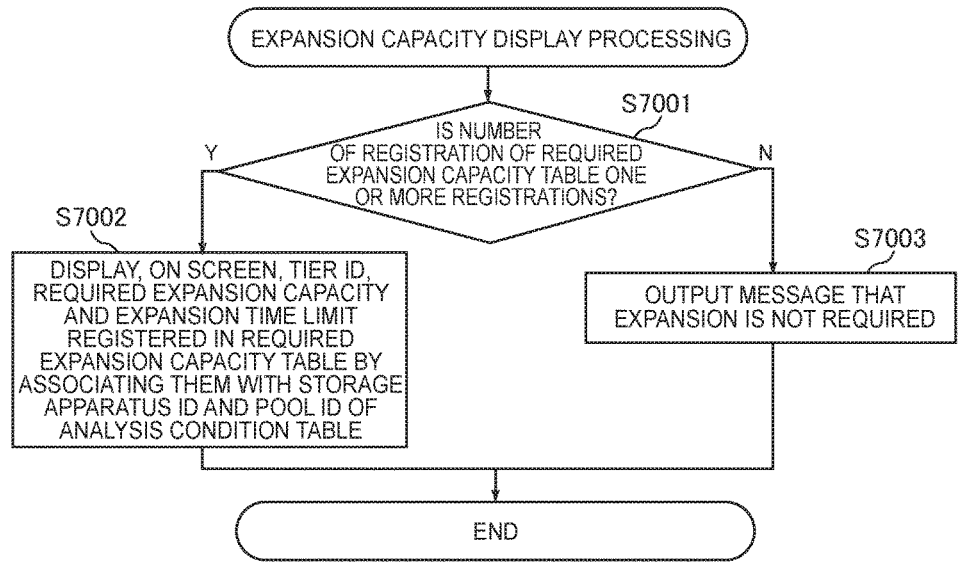
FIG. 43 is a flowchart showing an example of the expansion capacity display processing.

In this expansion capacity display processing, the analysis result display unit 111, as shown in FIG. 43, foremost determines whether the number of registrations of the required expansion capacity table 208 (refer to FIG. 27) is one registration or more (step S7001). When the number of registrations is not one or more registrations, the analysis result display unit 111 displays a message to the effect that expansion is not required (step S7003). Meanwhile, when the number of registrations is one registration or more, the analysis result display unit 111 associates the tier ID, the required expansion capacity and the expansion time limit registered in the required expansion capacity table 208 (refer to FIG. 27) with the storage apparatus ID and the pool ID of the analysis condition table 200, and displays the association on a screen (step S7002).

Figure 42:
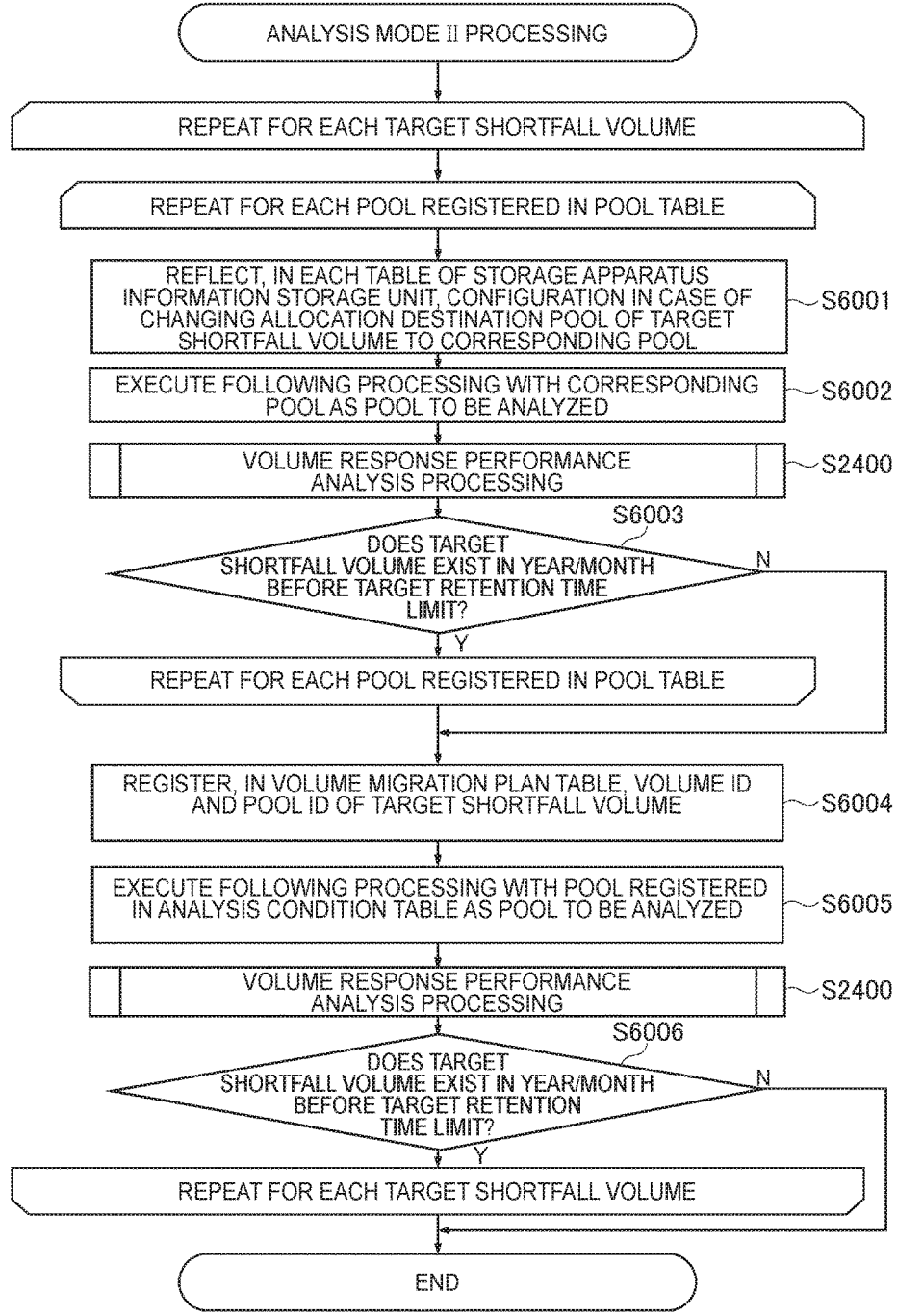
FIG. 42 is a flowchart showing an example of the analysis mode II processing.

Meanwhile, when it is determined that the analysis mode is II in step S3000 shown in FIG. 29, in the management computer 4, the analysis mode II processing unit 110 executes the analysis mode II processing shown in FIG. 42 based on the control of the processor 30. The analysis mode II processing unit 110 selects one target shortfall volume (specifically, a volume registered in the target shortfall volume table 207 and having a year/month which is before the target retention time limit registered in the target retention time limit table 221), and thereafter repeatedly executes the following processing.

Foremost, the analysis mode II processing unit 110 selects one pool ID which is not a pool ID registered in the pool table 231 (refer to FIG. 11) and not a pool ID registered in the analysis condition table 200, and thereafter repeatedly executes following steps S6001, S6002, S2400 and S6003.

Specifically, the analysis mode II processing unit 110 reflects the configuration, in a case where the allocation destination pool of the corresponding target shortfall volume has been changed to the pool of the corresponding pool ID, in the respective tables configuring the storage apparatus information storage unit 101 (step S6001). Next, the analysis mode II processing unit 110 executes the foregoing volume response performance analysis processing (refer to FIG. 32) with the corresponding pool as the pool to be analyzed (step S6002) (step S2400). The analysis mode II processing unit 110 determines whether or not there is a target shortfall volume in a year/month that is before the target retention time limit (step S6003), and executes processing from step S6004 described later when there is no such target shortfall volume. Meanwhile, when there is such a target shortfall volume, the analysis mode II processing unit 110 repeatedly executes foregoing steps S6001, S6002, S2400 and S6003 regarding all pool ID excluding the pool IDs registered in the pool table 231 (refer to FIG. 11) and the pool IDs registered in the analysis condition table 200.

As described above, when there is no target shortfall volume, the analysis mode II processing unit 110 executes step S6004. In step S6004, the analysis mode II processing unit 110 registers the volume ID of the corresponding target shortfall volume and the corresponding pool ID in the volume migration plan table 209 (refer to FIG. 28). Next, the analysis mode II processing unit 110 executes the volume response performance analysis processing (refer to FIG. 32) described above with the pool of the pool ID registered in the analysis condition table 200 (refer to FIG. 6) as the pool to be analyzed (step S6005) (step S2400). Next, the analysis mode II processing unit 110 determines whether or not there is a target shortfall volume in a year/month that is before the target retention time limit (step S6006), and ends the processing when there is no such target shortfall volume. Meanwhile, when there is such a target shortfall volume, the analysis mode II processing unit 110 repeatedly executes the foregoing processing from step S6001 regarding the target shortfall volume.

Figure 44:
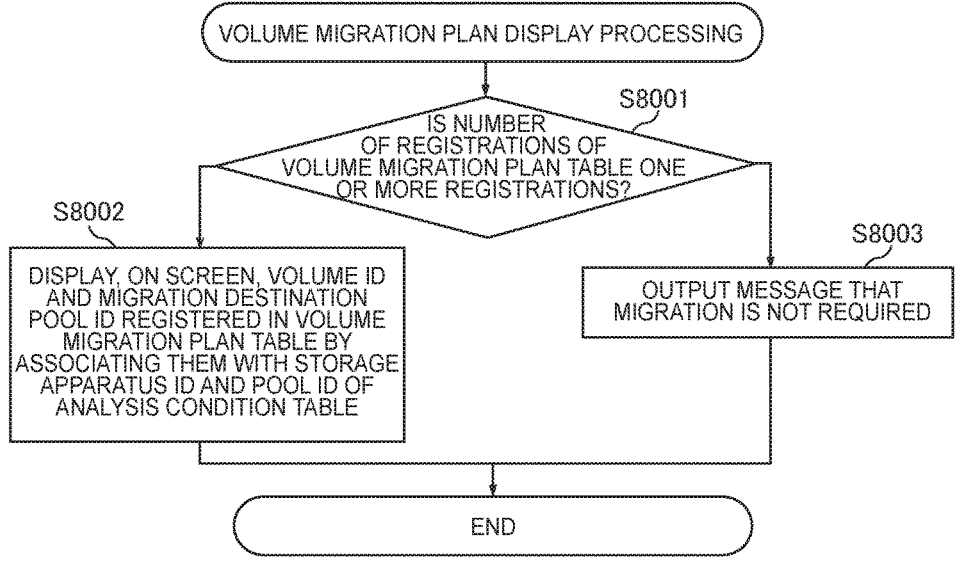
FIG. 44 is a flowchart showing an example of the volume migration plan display processing.

As described above, when the analysis mode II processing is ended, the analysis result display unit 111 executes the foregoing analysis result display processing (step S4000), and thereafter executes the volume migration plan display processing (step S8000). In this volume migration plan display processing, the analysis result display unit 111, as shown in FIG. 44, foremost determines whether or not the number of registrations of the volume migration plan table 209 (refer to FIG. 28) is one registration or more (step S8001).

When the number of registrations is one or more registrations, the analysis result display unit 111 associates the volume ID, the migration destination storage ID and the migration destination pool ID registered in the volume migration plan table 209 with the storage apparatus ID and the pool ID of the analysis condition table 200, and displays the association on a screen (step S8002). Meanwhile, when the number of registrations is not one or more registrations, the analysis result display unit 111 outputs a message to the effect that migration is not required (step S8003).

(6) Effect of this Embodiment

As described above, with the computer system 1 of this embodiment, in the management computer 4 as an example of a performance management device in the storage apparatus comprising two or more types of storage devices 20 which have mutually different rewriting limits and response performances, based on the following premises; specifically, when a write request is issued from the host computer 2 to an unwritten address of a virtual volume, the storage apparatus 3 writes data according to the write request in a storage area of a storage device among the two or more types of storage devices 20 which is unused and which has not yet reached a writing limit, and, according an IO load of the host computer 2 in each storage area of each of the two or more types of storage devices 20, the storage apparatus 3 migrates a storage location of data from a storage area of a storage device 20 with a lower response performance to a storage area of a storage device 20 with a higher response performance and which has not yet reached a writing limit, or from a storage area of a storage device 20 with a higher response performance to a storage area of a storage device 20 with a lower response performance and which has not yet reached a writing limit, the management computer 4 comprises the following characteristic configuration.

In other words, the management computer 4 additionally comprises the analysis mode I processing unit 109 and the analysis mode II processing unit 110 as an example of a performance influence estimation unit which estimates a decrement of a storage capacity pursuant to each of the two or more types of storage devices 20 reaching a rewriting limit, and estimates a performance influence on the virtual volume and a timing of occurrence thereof, and further comprises the analysis result display unit 111 as an example of a performance influence display unit which displays information related to the estimated performance influence and the timing of occurrence thereof.

According to the foregoing configuration, it is possible to support the formulation of an expansion plan of the storage devices 20 based on the estimated future performance influence and timing of occurrence thereof which was estimated due to a decrease in the storage capacity as a result of the respective storage mediums of the two or more types of storage device 20 which have mutually different rewriting limits and response performances reaching their limit.

As described above, in this embodiment, the analysis result display unit 111 displays a timing in which a response performance degradation of a volume will begin. According to the foregoing configuration, it is possible to support the formulation of an expansion plan of the storage devices 20 based on the timing in which the response performance degradation of the volume will begin which was estimated due to a decrease in the storage capacity as a result of the respective storage mediums of the two or more types of storage device 20 which have mutually different rewriting limits and response performances reaching their limit.

As described above, in this embodiment, the analysis result display unit 111 displays a timing in which a volume will no longer satisfy a target response performance. According to the foregoing configuration, it is possible to support the formulation of an expansion plan of the storage devices 20 based on the timing in which the volume will no longer satisfy the target response performance which was estimated due to a decrease in the storage capacity as a result of the respective storage mediums of the two or more types of storage device 20 which have mutually different rewriting limits and response performances reaching their limit.

As described above, in this embodiment, the analysis result display unit 111 displays a capacity of an expansion flash drive required for extending a target achievement period to a pre-set timing. According to the foregoing configuration, it is possible to support the formulation of an expansion plan of the storage devices 20 based on the capacity of the expansion flash drive required for extending the target achievement period to the pre-set timing which was estimated due to a decrease in the storage capacity as a result of the respective storage mediums of the two or more types of storage device 20 which have mutually different rewriting limits and response performances reaching their limit.

As described above, in this embodiment, the analysis result display unit 111 displays a target achievement period of a volume based on a capacity of a designated expansion flash drive. According to the foregoing configuration, it is possible to support the formulation of an expansion plan of the storage devices 20 based on information regarding to what extent the timing in which the response performance degradation of the volume will begin, or the timing in which the volume will no longer satisfy the target response performance, which was estimated due to a decrease in the storage capacity as a result of the respective storage mediums of the two or more types of storage device 20 which have mutually different rewriting limits and response performances reaching their limit, will be extended according to the capacity of the designated expansion flash drive.

As described above, in this embodiment, the analysis result display unit 111 displays a pool migration plan of a volume required for extending a target achievement period to a pre-set timing. According to the foregoing configuration, it is possible to support the formulation of an expansion plan of the storage devices 20 based on the pool migration plan of the volume required for extending the target achievement period to the pre-set timing which was estimated due to a decrease in the storage capacity as a result of the respective storage mediums of the two or more types of storage device 20 which have mutually different rewriting limits and response performances reaching their limit.

(7) Other Embodiments

Note that, while the foregoing embodiment explained a case of applying the present invention to the computer system 1 configured as shown in FIG. 1, the present invention is not limited thereto, and may also be broadly applied to computer systems of various other configurations. For example, while the foregoing embodiment explained a case where two or three storage apparatuses 3 are used, the present invention may also be applied cases where one storage apparatus 3 or four or more storage apparatuses 3 are used.

Moreover, while the embodiment described above explained a case where the management computer 4 equipped with the storage performance analyzing function and the storage management client 5 to be operated by the user are configured as separate units, the present invention is not limited thereto, and the management computer 4 and the storage management client 5 may also be configured from a single computer (for instance, a computer device).

Moreover, while the foregoing embodiment explained a case where the management computer 4 equipped with the storage performance analyzing function and the storage apparatuses 3 are configured as separate units, the present invention is not limited thereto, and the management computer 4 may also be configured integrally with one of the storage apparatuses 3.

INDUSTRIAL APPLICABILITY

The present invention can be broadly applied to a method and a device for managing the performance of a storage apparatus in which two or more types of storage mediums with mutually different rewriting limits and response performances are tiered, and data can be migrated between the respective tiers according to the response performance.

REFERENCE SIGNS LIST

1 . . . computer system, 2 . . . host computer, 3 . . . storage apparatus, 4 . . . management computer, 5 . . . storage management client, 20 . . . storage device, 30 . . . processor, 31 . . . memory.

The invention claimed is:

1. A performance management device of a storage apparatus comprising two or more types of storage mediums which have mutually different rewriting limits and response performances,
    wherein the storage apparatus provides, to a host computer connected to the storage apparatus, a virtual volume configuring a virtual logical volume by using the two or more types of storage mediums,
    wherein, when a write request is issued from the host computer to write data into an unwritten address of the virtual volume, the storage apparatus writes data according to the write request in a storage area of a storage medium among the two or more types of storage mediums which is unused and which has not yet reached a writing limit,
    wherein, according an IO load of the host computer in each storage area of each of the two or more types of storage mediums, the storage apparatus migrates a storage location of data from a storage area of a storage medium with a lower response performance to a storage area of a storage medium with a higher response performance and which has not yet reached a writing limit, or from a storage area of a storage medium with a higher response performance to a storage area of a storage medium with a lower response performance and which has not yet reached a writing limit, and
    wherein the performance management device includes:
    a performance influence estimation unit which estimates a decrement of a storage capacity pursuant to each of the two or more types of storage mediums reaching a rewriting limit, and estimates a performance influence on the virtual volume and a timing of occurrence thereof; and
    a performance influence display unit which displays information related to the estimated performance influence and the timing of occurrence thereof.

2. The performance management device of a storage apparatus according to claim 1, wherein the performance influence display unit displays a timing in which a response performance degradation of a volume will begin.

3. The performance management device of a storage apparatus according to claim 1, wherein the performance influence display unit displays a timing in which a volume will no longer satisfy a target response performance.

4. The performance management device of a storage apparatus according to claim 1, wherein the performance influence display unit displays a capacity of an expansion flash drive required for extending a target achievement period to a pre-set timing.

5. The performance management device of a storage apparatus according to claim 1, wherein the performance influence display unit displays a target achievement period of a volume based on a capacity of a designated expansion flash drive.

6. The performance management device of a storage apparatus according to claim 1, wherein the performance influence display unit displays a pool migration plan of a volume required for extending a target achievement period to a pre-set timing.

7. A performance management method based on a performance management device for managing a storage apparatus comprising two or more types of storage mediums which have mutually different rewriting limits and response performances,
    wherein the storage apparatus provides, to a host computer connected to the storage apparatus, a virtual volume configuring a virtual logical volume by using the two or more types of storage mediums,
    wherein, when a write request is issued from the host computer to write data into an unwritten address of the virtual volume, the storage apparatus writes data according to the write request in a storage area of a storage medium among the two or more types of storage mediums which is unused and which has not yet reached a writing limit,
    wherein, according an IO load of the host computer in each storage area of each of the two or more types of storage mediums, the storage apparatus migrates a storage location of data from a storage area of a storage medium with a lower response performance to a storage area of a storage medium with a higher response performance and which has not yet reached a writing limit, or from a storage area of a storage medium with a higher response performance to a storage area of a storage medium with a lower response performance and which has not yet reached a writing limit, and
    wherein the performance management method includes:
    a performance influence estimation step of estimating a decrement of a storage capacity pursuant to each of the two or more types of storage mediums reaching a rewriting limit, and estimating a performance influence on the virtual volume and a timing of occurrence thereof; and
    a performance influence display step of displaying information related to the estimated performance influence and the timing of occurrence thereof.

8. The performance management method of a storage apparatus according to claim 7, wherein, in the performance influence display step, the performance management device displays a timing in which a response performance degradation of a volume will begin.

9. The performance management method of a storage apparatus according to claim 7, wherein, in the performance influence display step, the performance management device displays a timing in which a volume will no longer satisfy a target response performance.

10. The performance management method of a storage apparatus according to claim 7, wherein, in the performance influence display step, the performance management device displays a capacity of an expansion flash drive required for extending a target achievement period to a pre-set timing.

11. The performance management method of a storage apparatus according to claim 7, wherein, in the performance influence display step, the performance management device displays a target achievement period of a volume based on a capacity of a designated expansion flash drive.

12. The performance management method of a storage apparatus according to claim 7, wherein, in the performance influence display step, the performance management device displays a pool migration plan of a volume required for extending a target achievement period to a pre-set timing.

* * * * *